US009511668B2

(12) United States Patent
Johansson et al.

(10) Patent No.: US 9,511,668 B2
(45) Date of Patent: *Dec. 6, 2016

(54) METHOD AND MODULE FOR CONTROLLING A VEHICLE'S SPEED BASED ON RULES AND/OR COSTS

(75) Inventors: Oskar Johansson, Stockholm (SE);
Maria Södergren, Segeltorp (SE);
Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/365,361

(22) PCT Filed: Dec. 22, 2011

(86) PCT No.: PCT/SE2011/051575
§ 371 (c)(1),
(2), (4) Date: Jun. 13, 2014

(87) PCT Pub. No.: WO2013/095237
PCT Pub. Date: Jun. 27, 2013

(65) Prior Publication Data
US 2014/0350820 A1    Nov. 27, 2014

(30) Foreign Application Priority Data
Dec. 22, 2011    (SE) ..................... 1151256

(51) Int. Cl.
*B60K 31/00*    (2006.01)
*B60W 30/14*    (2006.01)
*B60W 50/00*    (2006.01)

(52) U.S. Cl.
CPC ............ *B60K 31/00* (2013.01); *B60W 30/143* (2013.01); *B60W 50/0097* (2013.01);
(Continued)

(58) Field of Classification Search
CPC .. B60K 31/00; B60K 2310/244; B60W 30/14; B60W 30/143; B60W 2550/402; Y02T 10/84
(Continued)

(56) References Cited

U.S. PATENT DOCUMENTS

| 4,870,583 A | 9/1989 | Takahashi et al. ............. 701/93 |
| 5,758,306 A | 5/1998 | Nakamura ....................... 701/93 |

(Continued)

FOREIGN PATENT DOCUMENTS

| DE | 103 27 255 | 2/2004 |
| DE | 10 2005 045 891 | 2/2007 |

(Continued)

OTHER PUBLICATIONS

Maria Ivarsson, "Fuel Optimal Powertrain Control for Heavy Trucks Utilizing Look Ahead," Linköping Studies in Science and Technology, Thesis No. 1400, ISBN 978-91-7393-637-8, SE, Linköping, 2009.

(Continued)

*Primary Examiner* — Atul Trivedi
(74) *Attorney, Agent, or Firm* — Ostrolenk Faber LLP

(57) ABSTRACT

A method for controlling a vehicle's speed, including: acquiring a set speed; determining, using using map and location data, a horizon made of route segments, each with a route characteristic; performing simulation cycles, each including: predicting the speed according to a conventional cruise control, which first prediction depends on the route characteristic; comparing the first predicted speed with lower and upper limit values, which define an engine torque for use in the next simulation cycle; making a second prediction of the speed when the engine torque depends on the comparison in the immediately preceding simulation cycle; comparing, as a second comparison, the second
(Continued)

predicted speed with second lower and upper limit values, which delineate a speed range within which the speed is maintained; determining, based on the second comparison and/or the second predicted speed in this simulation cycle, a reference value for use by a vehicle control system.

42 Claims, 8 Drawing Sheets

(52) U.S. Cl.
CPC ............... *B60K 2310/244* (2013.01); *B60W 2050/0013* (2013.01); *B60W 2550/143* (2013.01); *B60W 2550/145* (2013.01); *B60W 2550/402* (2013.01); *Y02T 10/84* (2013.01)

(58) Field of Classification Search
USPC .......................................................... 701/93
See application file for complete search history.

(56) References Cited

U.S. PATENT DOCUMENTS

| | | | |
|---|---|---|---|
| 5,774,820 A | 6/1998 | Linden et al. ................. 701/93 |
| 5,839,534 A * | 11/1998 | Chakraborty ...... B60K 31/0008 |
| | | | 180/169 |
| 5,931,886 A | 8/1999 | Moroto et al. | |
| 6,076,036 A | 6/2000 | Price et al. | |
| 6,098,005 A | 8/2000 | Tsukamoto et al. | |
| 6,282,483 B1 * | 8/2001 | Yano ................. B60K 31/0008 |
| | | | 340/435 |
| 6,782,961 B1 | 8/2004 | Ishikawa et al. | |
| 6,990,401 B2 | 1/2006 | Neiss et al. | |
| 7,085,637 B2 | 8/2006 | Breed et al. ................. 701/38 |
| 7,103,460 B1 * | 9/2006 | Breed ................. B60C 23/0408 |
| | | | 701/29.1 |
| 7,315,804 B2 * | 1/2008 | Sato .................... B60T 8/17551 |
| | | | 700/286 |
| 8,260,488 B2 * | 9/2012 | Ishikawa ............... G07C 5/085 |
| | | | 701/29.1 |
| 8,392,087 B2 | 3/2013 | Kodama et al. ............... 701/75 |
| 8,452,509 B2 | 5/2013 | Sujan et al. .................. 701/70 |
| 8,620,557 B2 * | 12/2013 | Johansson ............. B60W 10/06 |
| | | | 701/93 |
| 8,620,558 B2 * | 12/2013 | Johansson ........... B60W 30/143 |
| | | | 701/93 |
| 2003/0221886 A1 | 12/2003 | Petrie, Jr. et al. | |
| 2004/0068359 A1 | 4/2004 | Neiss et al. ..................... 701/93 |
| 2004/0149106 A1 | 8/2004 | Hess | |
| 2004/0182652 A1 | 9/2004 | Ammon et al. | |
| 2004/0204286 A1 * | 10/2004 | Stridsberg ............... B60K 6/405 |
| | | | 477/14 |
| 2005/0055157 A1 | 3/2005 | Scholl ........................... 701/207 |
| 2005/0096183 A1 | 5/2005 | Watanabe et al. | |
| 2005/0192727 A1 * | 9/2005 | Shostak .................. B60C 11/24 |
| | | | 701/37 |
| 2005/0273218 A1 * | 12/2005 | Breed ....................... B60C 11/24 |
| | | | 701/2 |
| 2006/0106521 A1 | 5/2006 | Nasr et al. | |
| 2007/0012013 A1 | 1/2007 | Strosser et al. | |
| 2007/0192013 A1 * | 8/2007 | Bando ........................ B60T 7/22 |
| | | | 701/93 |
| 2007/0208485 A1 * | 9/2007 | Yamamura ......... B60K 31/0066 |
| | | | 701/93 |
| 2007/0265759 A1 | 11/2007 | Salinas et al. ................. 701/93 |
| 2008/0033621 A1 * | 2/2008 | Nakamura ......... B60K 31/0066 |
| | | | 701/65 |
| 2009/0063000 A1 | 3/2009 | Kodama et al. ................ 701/75 |
| 2009/0118918 A1 * | 5/2009 | Heap ...................... B60K 6/365 |
| | | | 701/54 |
| 2009/0118920 A1 * | 5/2009 | Heap ...................... B60K 6/365 |
| | | | 701/54 |
| 2009/0259354 A1 | 10/2009 | Krupadanam et al. ......... 701/22 |
| 2010/0030447 A1 | 2/2010 | Smyth et al. ................. 701/102 |
| 2010/0049400 A1 | 2/2010 | Duraiswamy et al. ......... 701/35 |
| 2010/0193616 A1 | 8/2010 | Berger et al. | |
| 2010/0198450 A1 | 8/2010 | Shin | |
| 2011/0106388 A1 * | 5/2011 | Boeckenhoff ......... B60W 10/06 |
| | | | 701/70 |
| 2011/0208405 A1 * | 8/2011 | Tripathi .................. F02D 17/02 |
| | | | 701/102 |
| 2011/0213540 A1 * | 9/2011 | Tripathi .................. F02D 37/02 |
| | | | 701/102 |
| 2011/0276216 A1 | 11/2011 | Vaughan | |
| 2011/0313647 A1 | 12/2011 | Koebler et al. ................ 701/123 |
| 2012/0083943 A1 * | 4/2012 | Johansson ............. B60W 10/06 |
| | | | 701/1 |
| 2012/0150411 A1 * | 6/2012 | Oosawa ............. B60K 31/0008 |
| | | | 701/96 |
| 2012/0197501 A1 | 8/2012 | Sujan et al. ..................... 701/51 |
| 2012/0277940 A1 * | 11/2012 | Kumar ................. B61L 27/0027 |
| | | | 701/20 |
| 2013/0085651 A1 * | 4/2013 | Johannsson ......... B60W 30/143 |
| | | | 701/93 |
| 2013/0151106 A1 * | 6/2013 | Johansson ............... B60K 31/00 |
| | | | 701/93 |
| 2014/0277971 A1 * | 9/2014 | Oshiro .................. B60W 50/14 |
| | | | 701/51 |
| 2014/0330503 A1 * | 11/2014 | Johansson ......... B60W 50/0097 |
| | | | 701/93 |
| 2014/0343818 A1 * | 11/2014 | Johansson ............... B60K 31/00 |
| | | | 701/94 |
| 2014/0343819 A1 * | 11/2014 | Johansson ......... B60W 50/0097 |
| | | | 701/96 |
| 2014/0350819 A1 * | 11/2014 | Johansson ............... B60K 31/00 |
| | | | 701/93 |
| 2014/0350820 A1 * | 11/2014 | Johansson ............... B60K 31/00 |
| | | | 701/93 |
| 2014/0350821 A1 * | 11/2014 | Johansson ......... B60W 50/0097 |
| | | | 701/93 |
| 2015/0006055 A1 * | 1/2015 | Johansson ......... B60W 50/0097 |
| | | | 701/93 |
| 2015/0191170 A1 * | 7/2015 | Johansson ............... B60K 31/00 |
| | | | 701/94 |
| 2015/0210281 A1 * | 7/2015 | Johansson ......... B60W 50/0097 |
| | | | 701/94 |

FOREIGN PATENT DOCUMENTS

| | | |
|---|---|---|
| DE | 10 2009 030 784 A1 | 2/2010 |
| DE | 10 2008 035 944 A1 | 4/2010 |
| DE | 10 2010 003 428 A1 | 10/2011 |
| EP | 0 838 363 | 4/1998 |
| GB | 2480877 A | 12/2011 |
| JP | 2007-276542 A | 10/2007 |
| WO | WO 01/15927 | 3/2001 |
| WO | WO 2006/107267 A1 | 10/2006 |
| WO | WO 2010/144028 A1 | 12/2010 |
| WO | WO 2010/144030 A1 | 12/2010 |
| WO | WO 2011/126430 A1 | 10/2011 |
| WO | WO 2011/126431 A1 | 10/2011 |
| WO | WO 2011/162705 A1 | 12/2011 |
| WO | WO 2011/162706 A1 | 12/2011 |

OTHER PUBLICATIONS

International Search Report mailed Sep. 7, 2012 in corresponding PCT International Application No. PCT/SE2011/051575.

Erik Hellström et al., "Look-ahead control for heavy trucks to minimize trip time and fuel consumption," Control Engineering Practice, 17(2):245-254, 2009.

Sangjun Park et al., "Predictive Eco-Cruise Control: Algorithm and Potential Benefits," 2011 IEEE Forum on Integrated and Sustainable Transportation Systems (FISTS), pp. 394-399, Vienna, Austria, Jun. 29-Jul. 1, 2011.

Erik Hellström, "Explicit use of road topography for model predictive cruise control in heavy trucks," Master's thesis performed in Vehicular Systems, ISRN: LiTH-ISY-EX—05/3660—SE, Linköping, Feb. 21, 2005.

(56) References Cited

OTHER PUBLICATIONS

International Search Report mailed Sep. 6, 2012 in corresponding PCT International Application No. PCT/SE2011/051568.
International Search Report mailed Sep. 7, 2012 in corresponding PCT International Application No. PCT/SE2011/051578.
International Search Report dated Sep. 13, 2012 issued in corresponding International patent application No. PCT/SE2011/051577.
International Search Report dated Sep. 14, 2012 issued in corresponding International patent application No. PCT/SE2011/051570.
International Search Report mailed Sep. 11, 2012 in corresponding PCT International Application No. PCT/SE2011/051585.
International Search Report mailed Sep. 7, 2012 in corresponding PCT International Application No. PCT/SE2011/051569.
Office Action mailed Mar. 16, 2015 in U.S. Appl. No. 14/364,796.
Office Action mailed May 6, 2015 in U.S. Appl. No. 14/367,509.
Notice of Allowance mailed Apr. 13, 2015 in U.S. Appl. No. 14/367,465.
Notice of Allowance mailed Apr. 24, 2015 in U.S. Appl. No. 14/365,331.
International Search Report dated Oct. 6, 2011 issued in PCT International Application No. PCT/SE2011/050808.
Anders Fröberg, "Efficient Simulation and Optimal Control for Vehicle Propulsion", Department of Electrical Engineering, Linköpings universitet, SE-581 83 Linköping, Sweden, 2008.
International Search Report mailed Oct. 6, 2011 in corresponding PCT International Application No. PCT/SE2011/050809.

* cited by examiner

METHOD AND MODULE FOR CONTROLLING A VEHICLE'S SPEED BASED ON RULES AND/OR COSTS

CROSS-REFERENCE TO RELATED APPLICATIONS

The present application is a 35 U.S.C. §§371 national phase conversion of PCT/SE2011/051575, filed Dec. 22, 2011, which claims priority of Swedish Application No. 1151256-3, filed Dec. 22, 2011. The contents of both applications are incorporated by reference herein. The PCT International Application was published in the English language.

FIELD OF THE INVENTION

The present invention relates to a method and a module for controlling a vehicle's speed on the basis of its predicted speed according to the present disclosure.

BACKGROUND TO THE INVENTION

Cruise control is now usual in motor vehicles, e.g. cars, trucks and buses. An object of cruise control is to achieve a uniform predetermined speed. This is done either by adjusting the engine torque to avoid retardation, or by applying braking action on downhill runs where the vehicle is accelerated by its own weight. A more general object of cruise control is to provide convenient driving and better comfort for the vehicle's driver. A driver of a vehicle equipped with cruise control usually chooses a set speed $v_{set}$ as the speed he/she wishes the vehicle to maintain on level roads. A cruise control then supplies an engine system of the vehicle with a reference speed $v_{ref}$ used for control of the engine. The set speed $v_{set}$ may thus be regarded as an input signal to the cruise control, whereas the reference speed $v_{ref}$ may be regarded as an output signal from the cruise control and is used for control of the engine.

Today's traditional cruise control (CC) maintains a constant reference speed $v_{ref}$ usually set by the vehicle's driver in the form of a set speed $v_{set}$ which is thus here a desired speed chosen for example by him/her, and for today's conventional cruise controls the reference speed is constant and equal to the set speed, i.e. $v_{ref}=v_{set}$. The value of the reference speed $v_{ref}$ changes only when adjusted by the driver while the vehicle is in motion. The reference speed $v_{ref}$ is then sent to a control system which controls the vehicle so that its speed corresponds when possible to the reference speed $v_{ref}$. If the vehicle is equipped with an automatic gearchange system, the gears may be changed by that system on the basis of the reference speed $v_{ref}$ to enable the vehicle to maintain the reference speed $v_{ref}$, i.e. to enable it to maintain the desired set speed $v_{set}$.

In hilly terrain, the cruise control system will try to maintain the set speed vset uphill and downhill. This may result inter alia in the vehicle accelerating over the crest of a hill and into a subsequent downgrade. It will then need to be braked to avoid exceeding the set speed $v_{set}$ or will reach a speed $v_{kfb}$ at which the constant speed brake is activated, which is a fuel-expensive way of driving the vehicle. It may also need to be braked downhill to avoid exceeding the set speed $v_{set}$ or the constant speed brake's activation speed $v_{kfb}$ in cases where the vehicle does not accelerate over the crest of the hill.

To reduce fuel consumption, especially on hilly roads, economical cruise controls such as Scania's Ecocruise® have been developed. This cruise control tries to estimate the vehicle's current running resistance and also has information about its historical running resistance. The economical cruise control may also be provided with map data comprising topographical information. The vehicle is then located on the map, e.g. by means of GPS, and the running resistance along the road ahead is estimated. The vehicle's reference speed $v_{ref}$ can thus be optimised for different types of roads in order to save fuel, in which case the reference speed $v_{ref}$ may differ from the set speed $v_{set}$. This specification refers to cruise controls which allow the reference speed $v_{ref}$ to differ from the set speed $v_{set}$ chosen by the driver, i.e. reference speed-regulating cruise controls.

An example of a further development of an economical cruise control is a "look ahead" cruise control (LACC), a strategic form of cruise control which uses knowledge of sections of road ahead, i.e. knowledge of the nature of the road ahead, to determine the reference speed $v_{ref}$. LACC is thus an example of a reference speed-regulating cruise control whereby the reference speed $v_{ref}$ is allowed, within a certain range $[v_{min}, v_{max}]$, to differ from the set speed $v_{set}$ chosen by the driver, in order to achieve more fuel saving.

Knowledge of the road section ahead may for example comprise information about prevailing topology, road curvature, traffic situation, roadworks, traffic density and state of road. It may further comprise a speed limit on the section ahead, and a traffic sign beside the road. Such knowledge is for example available from location information, e.g. GPS (global positioning system) information, map information and/or topographical map information, weather reports, information communicated between vehicles and information provided by radio. All this knowledge may be used in a variety of ways. For example, information about a speed limit on the road ahead may be used to achieve fuel efficiency by lowering the vehicle's speed before reaching a lower speed limit. Similarly, knowledge of a road sign which indicates for example a roundabout or intersection ahead may also be used to achieve fuel efficiency by braking before the vehicle reaches the roundabout or intersection.

An LACC cruise control does for example make it possible, before a steep upgrade, for the reference speed $v_{ref}$ to be raised to a level above the set speed $v_{set}$, since the vehicle will be expected to lose speed on such a climb owing to high train weight relative to engine performance. Similarly, before a steep downgrade, the LACC cruise control makes it possible for the reference speed $v_{ref}$ to be lowered to a level below the set speed $v_{set}$, since the vehicle will be expected to accelerate on such a downgrade owing to its high train weight. The concept here is that reducing the speed at which the vehicle begins the downhill run makes it possible to reduce the energy braked away and/or the air resistance losses (as reflected in the amount of fuel injected before the downgrade). The LACC cruise control may thus reduce fuel consumption without substantially affecting journey time.

An example of a previously known cruise control which uses topographical information is described in the document entitled "Explicit use of road topography for model predictive cruise control in heavy trucks" by Erik Hellström, ISRN: LiTH-ISY-EX-05/3660-SE. Cruise control is here effected by real-time optimisation, and a cost function is used to define the optimisation criteria. A large number of different solutions are here calculated and evaluated, and the solution resulting in lowest cost is applied. As a considerable amount of calculations is involved, the processor which is to perform them needs a large capacity.

Other known solutions for cruise control have reduced the number of possible solutions by opting instead to iterate from one solution along the vehicle's intended route. However, the topography of the itinerary and the vehicle's weight and engine performance may lead to various heavy demands in terms of processor load for determining the reference speed $v_{ref}$. More calculations are needed when, for example, a heavily laden truck with medium-high power output travels on a hilly road as compared with a lightly laden truck with a higher power output travelling on a relatively level road. The reason is that the truck in the first case is likely to accelerate on each downgrade and decelerate on each upgrade, whereas in the second case the truck will find the road substantially level.

The built-in system's processor will thus be subject to relatively large demands if the previously known solutions are applied, since the processor load may vary greatly in different circumstances. For example, the capacity of the processor needs to be sufficient to deal quickly with cases where a large number of calculations have to be done in a limited time. The processor has therefore to be dimensioned to cater for such cases despite the fact that they arise during only a limited portion of the processor time used.

SUMMARY OF THE DISCLOSURE

An object of the present invention is to propose an improved system for controlling a vehicle's speed so that the amount of fuel used can be minimised and, in particular, for controlling the vehicle's speed in such a way that the processor load will be smaller and more uniform over time. A further object of the invention is to propose a simplified cruise control which behaves more predictably than previous known economical and/or reference speed-regulating cruise controls.

According to an aspect of the present invention, at least one of the objects described above is achieved by applying the aforesaid method for controlling a vehicle's speed, which method is characterised by:

acquiring a set speed $v_{set}$ for the vehicle;

determining a horizon for the itinerary by means of map data and location data, which horizon comprises one or more route segments with at least one characteristic for each segment;

performing, during each of a number of simulation cycles $s_j$ each comprising a number N of simulation steps conducted at a predetermined rate f, the steps of:

making a first prediction of the vehicle's speed $v_{pred\_cc}$ along the horizon according to a conventional cruise control when the set speed $v_{set}$ is imparted as a reference speed $v_{ref}$, which first prediction depends on the characteristics of said route segment;

doing a first comparison of the first predicted vehicle speed $v_{pred\_cc}$ with at least one of first lower and upper limit values $v_{lim1}$ and $v_{lim2}$ which are used to define an engine torque T for use in the next simulation cycle $s_{j+1}$;

making a second prediction of the vehicle's speed $v_{pred\_Tnew}$ along the horizon when the vehicle's engine torque T is a value which depends on the result of said first comparison in the immediately preceding simulation cycle $s_{j-1}$;

doing a second comparison of the second predicted vehicle speed $v_{pred\_Tnew}$ with at least one of second lower and upper limit values $v_{min}$ and $v_{max}$ which delineate a range within which the vehicle's speed should be;

determining at least one reference value which indicates how the vehicle's speed is to be influenced, on the basis of said second comparison and/or the second predicted vehicle speed $v_{pred\_Tnew}$ in this simulation cycle $s_j$; and using in a control system of the vehicle at least one reference value on which the vehicle is then regulated.

According to an aspect of the present invention, at least one of the objects described above is achieved by using the aforesaid module to control a vehicle's speed, which module is characterised by:

an input unit adapted to receiving a set speed $v_{set}$ for the vehicle;

a horizon unit adapted to determining a horizon for the itinerary by means of map data and location data which comprise route segments with at least one characteristic for each segment;

a calculation unit adapted to performing, during each of a number of simulation cycles $s_j$ each comprising a number N of simulation steps conducted at a predetermined rate f, the steps of:

making a first prediction of the vehicle's speed $v_{pred\_cc}$ along the horizon according to a conventional cruise control when the set speed $v_{set}$ is imparted as a reference speed $v_{ref}$, which first prediction depends on the characteristics of said route segment;

doing a first comparison of the first predicted vehicle speed $v_{pred\_cc}$ with at least one of first lower and upper limit values $v_{lim1}$ and $v_{lim2}$ which are used to define an engine torque T for use in the next simulation cycle $s_{j+1}$;

making a second prediction of the vehicle's speed $v_{pred\_Tnew}$ along the horizon when the vehicle's engine torque T is a value which depends on the result of said first comparison in the immediately preceding simulation cycle $s_{j-1}$;

doing a second comparison of the second predicted vehicle speed $v_{pred\_Tnew}$ with at least one of second lower and upper limit values $v_{min}$ and $v_{max}$ which delineate a range within which the vehicle's speed should be; and determining at least one reference value which indicates how the vehicle's speed is to be influenced, on the basis of said second comparison and/or the second predicted vehicle speed $v_{pred\_Tnew}$ in this simulation cycle $s_j$; and a providing unit adapted to supplying a control system of the vehicle with said at least one reference value on which the vehicle is then regulated.

The control of the vehicle's speed by applying the method described above and/or using the module described above result in a substantially constant processor load, since similar numbers of predictions are made during each simulation cycle at a constant rate f. According to the present invention, the processor load is independent of the vehicle's power output and weight and the nature of the road's topography. The processor which is to perform the calculations knows here how much processor power will be needed over time, which makes it very easy to allocate sufficient processor power over time. The processor load will thus here be substantially similar in different situations with different topography and also be independent of the vehicle's engine torque. This means that the processor which is to perform the calculations can be dimensioned without having to cater for peaks associated with worst possible situations. The processor can instead be dimensioned to cater for a uniform processor load. The processor cost can thus be reduced, leading also to lower production costs for the vehicle.

Only vehicle speed variations ahead along the horizon, i.e. the first predicted vehicle speed $v_{pred\_cc}$ and the second predicted vehicle speed $v_{pred\_Tnew}$, for two different ways of driving the vehicle, are predicted, rendering the processor load relatively small. Depending on the results of the two predicted modes of driving, i.e. the first predicted vehicle speed $v_{pred\_cc}$ and the second predicted vehicle speed $v_{pred\_Tnew}$, this is followed by choosing the reference value to be used for regulating the vehicle's speed.

By predicting the vehicle's speed at some other torque T, e.g. minimum torque which retards the vehicle or maximum torque which accelerates it, the system can evaluate which reference value should be used in regulating the vehicle's speed. Various embodiments use a reference value determined during a previous simulation cycle $s_{j-n}$ in the control of the vehicle's speed if the second predicted vehicle speed $v_{pred\_Tnew}$ is above/below the limit values $v_{max}$, $v_{min}$.

According to an embodiment of the invention, the reference value on which the vehicle speed is to be regulated is based on at least one rule. This rule or rules thus define how to choose the reference value.

According to an embodiment of the present invention, at least one of these rules is that the reference value on which the vehicle speed is to be regulated is a value corresponding to the set speed $v_{set}$ if the second predicted vehicle speed $v_{pred\_Tnew}$ in the second comparison is above the second upper limit value $v_{max}$ or below the second lower limit value $v_{min}$.

According to an embodiment, the reference speed $v_{ref}$ is determined to a value which represents the second predicted vehicle speed $v_{pred\_Tnew}$ if a minimum value for the latter is equal to or above the second lower limit value $v_{min}$ and if also a maximum value for it is equal to or above a further upper limit value $v_{max2}$ which is related to a set speed $v_{set}$. According to an embodiment, the reference speed $v_{ref}$ is determined to a value which represents the second predicted vehicle speed $v_{pred\_Tnew}$ if a maximum value for the latter is equal to or above the upper limit value $v_{max}$ and if also a minimum value for it is equal to or below a further lower limit value $v_{min2}$ which is related to a set speed.

According to an embodiment of the invention, the simulations done according to the method of the invention are evaluated by use of cost functions. The cost is here calculated for the second predicted vehicle speed $v_{pred\_Tnew}$ and/or a third predicted vehicle speed $v_{pred\_Tk+new}$. In other words, the costs are here calculated for these two different simulated modes of driving. This evaluation uses at least one cost function $J_{Tnew}$, $J_{Tk+new}$ based on calculations of at least one from among a vehicle speed profile v, an energy consumption E and a journey time t.

According to an embodiment of the invention, the reference value to be used in regulating the vehicle speed is determined on the basis of a fourth comparison between the cost functions $J_{Tnew}$ and $J_{Tk+new}$ for the second predicted vehicle speed $v_{pred\_Tnew}$ and for a third predicted vehicle speed $v_{pred\_Tk+new}$.

According to an embodiment of the invention, a penalty may be added to at least one of the cost functions $J_{Tnew}$, $J_{Tk+new}$ if the second predicted vehicle speed $v_{pred\_Tnew}$ and the third predicted vehicle speed $v_{pred\_Tk+new}$ reach different final speeds. The penalty is here added if these second and third predicted speeds do not reach the same final speed, to compensate for different final speeds being compared.

Preferred embodiments of the invention are described herein.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Figure 1:
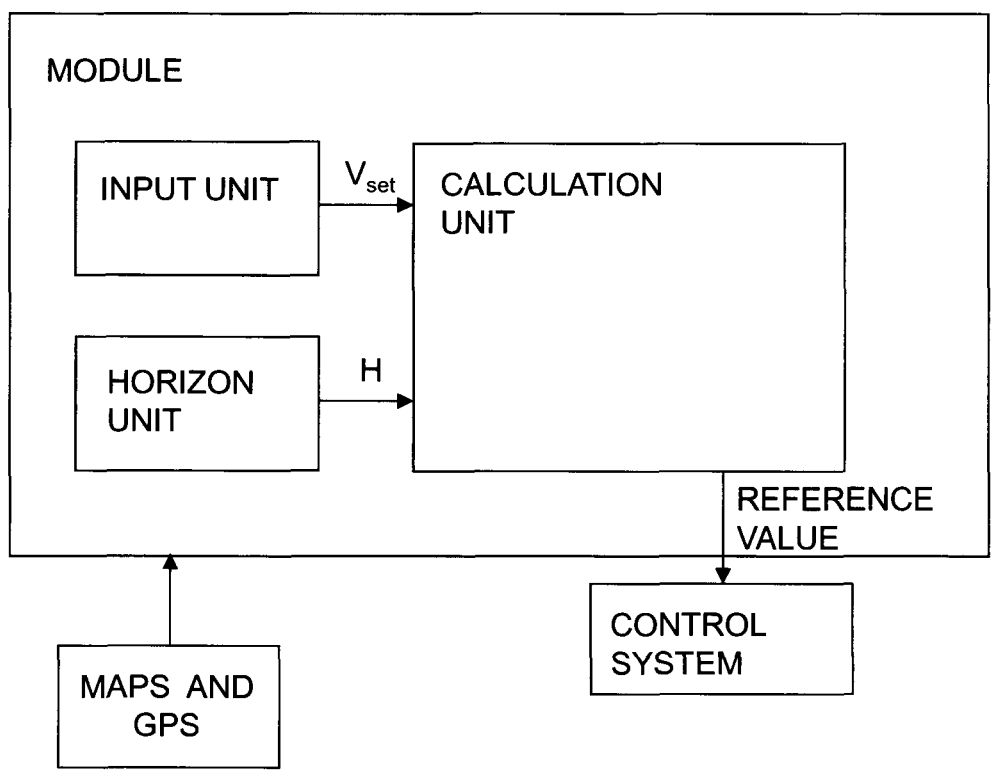
FIG. 1 depicts a module according to an embodiment of the invention.

FIG. 1 depicts a module for controlling a vehicle's speed according to an aspect of the invention. The module comprises an input unit adapted to receiving a desired speed, i.e. a set speed $v_{set}$, for the vehicle. The driver may for example set a speed $v_{set}$ which he/she wishes the vehicle to maintain. The module comprises also a horizon unit adapted to determining a horizon H for the itinerary by means of map data and location data. The horizon H is made up of route segments with at least one characteristic for each segment. A possible example of characteristics of segments is their gradient a, in radians.

The description of the present invention states that GPS (global positioning system) is used to determine location data for the vehicle, but specialists will appreciate that other kinds of global or regional positioning systems are conceivable to provide these data. Such positioning systems might for example use radio receivers to determine the vehicle's location. The vehicle might also use sensors to scan the surroundings and thereby determine its location.

FIG. 1 illustrates how the module is provided with information about the itinerary from maps (map data) and GPS (location data). The itinerary is sent to the module bit by bit, e.g. via CAN (controller area network) bus. The module may be separate from or be part of the one or more control systems which are to use reference values for regulating. An example of such a control system is the vehicle's engine control system. Alternatively, the unit which handles maps and positioning systems may be part of a system which is to use reference values for regulating. In the module, the bits of the itinerary are then put together in a horizon unit to construct a horizon and are processed by the processor unit to create an internal horizon on which the control system can regulate. The horizon is then continually supplemented by new bits of itinerary from the unit with GPS and map data, to maintain a desired length of horizon. The horizon is thus updated continuously when the vehicle is in motion.

CAN is a serial bus system specially developed for use in vehicles. The CAN data bus makes digital data exchange possible between sensors, regulating components, actuators, control devices etc., and provides assurance that two or more control devices can have access to the signals from a given sensor in order to use them to control components connected to them. Each of the connections between the units illustrated in FIG. 1 may take the form of one or more from among a cable, a data bus, e.g. a CAN (controller area network) bus, an MOST (media orientated systems transport) bus, or some other bus configuration, or a wireless connection.

The module comprises also a calculation unit adapted to, during a number of simulation cycles $s_j$ each comprising a number N of simulation steps which are conducted at a predetermined rate f, in each simulation cycle make a first prediction of the vehicle's speed $v_{pred\_cc}$ along the horizon according to a conventional cruise control when the desired speed $v_{set}$ is imparted as a reference speed $v_{ref}$ which first prediction depends on the characteristics of said route segment. A first comparison is also done between the first predicted vehicle speed $v_{pred\_cc}$ and first lower and upper limit values $v_{lim1}$ and $v_{lim2}$ which are used to define an engine torque T for use in the next simulation cycle $s_{j+1}$.

A second prediction of the vehicle speed $v_{pred\_Tnew}$ along the horizon is then made on the basis of a vehicle engine torque T which depends on the result of said first comparison in the immediately preceding simulation cycle $s_{j-1}$. This simulation cycle $s_j$ thus here uses the first comparison in the preceding simulation cycle $s_{j-1}$ when the second prediction of the vehicle speed $v_{pred\_Tnew}$ is made in this simulation cycle $s_j$.

In a second comparison, the second predicted vehicle speed $v_{pred\_Tnew}$ is then compared with second lower and upper limit values $v_{min}$ and $v_{max}$ which delineate a range within which the vehicle's speed should be. This is followed by determining at least one reference value which indicates how the vehicle's speed is to be influenced on the basis of said second comparison and/or the second predicted vehicle speed $v_{pred\_Tnew}$ in this simulation cycle $s_j$.

The module is further arranged to supply, e.g. by sending, to a control system of the vehicle said at least one reference value on which the vehicle is then regulated. How the predictions of the speeds are made will be explained in more detail below.

The module and/or the calculation unit comprise at least a processor and a memory unit which are adapted to making all the calculations, predictions and comparisons of the method according to the invention. Processor means here a processor or microcomputer, e.g. a circuit for digital signal processing (digital signal processor, DSP), or a circuit with a predetermined specific function (application specific integrated circuit, ASIC). The calculation unit is connected to a memory unit which provides it with, for example, the stored programme code and/or stored data which the calculation unit needs to enable it to do calculations. The calculation unit is also adapted to storing partial or final results of calculations in the memory unit.

The method for control of vehicle speed according to the present invention and its various embodiments may also be implemented in a computer programme which, when executed in a computer, e.g. the aforesaid processor, causes the computer to apply the method. The computer programme usually takes the form of a computer programme product stored on a digital storage medium, and is contained in a computer programme product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

Figure 2:
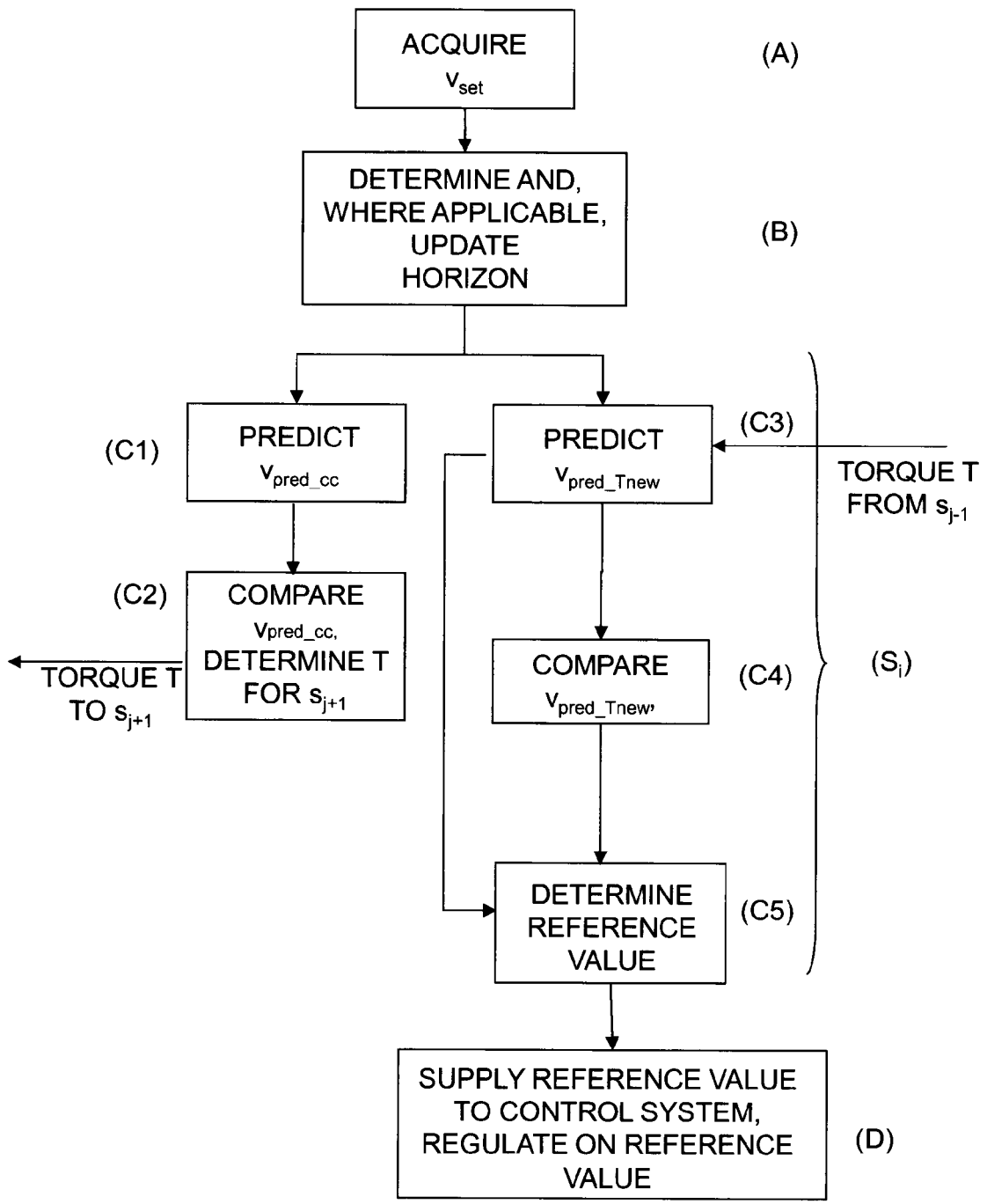
FIG. 2 depicts a flowchart for the method according to an embodiment of the invention.

FIG. 2 is a flowchart for the steps of a method for controlling the vehicle's speed according to an embodiment of the invention. The method comprises a first step A) of acquiring $v_{set}$ as a desired set speed for the vehicle to maintain, and a second step B) of determining a horizon for the itinerary by means of map data and location data which comprise route segments with at least one characteristic for each segment.

According to the method, a number of simulation cycles are then done along the length of the horizon. A simulation cycle $s_j$ comprises a number N of simulation steps conducted at a predetermined rate f, and the following steps are performed during a simulation cycle $s_j$;

C1) Making a first prediction of the vehicle's speed $v_{pred\_cc}$ along the horizon according to a conventional cruise control when the desired speed $v_{set}$ is imparted as a reference speed $v_{ref}$ which first prediction depends on the characteristics of said route segment.

C2) Doing a first comparison of the first predicted vehicle speed $v_{pred\_cc}$ with first lower and upper limit values $v_{lim1}$ and $v_{lim2}$ which are used to define an engine torque T for use in the next simulation cycle $s_{j+1}$.

C3) Making a second prediction of the vehicle's speed $v_{pred\_Tnew}$ along the horizon when the vehicle's engine torque T depends on the result of said first comparison in the immediately preceding simulation cycle $s_{j-1}$. During a simulation cycle $s_j$ the prediction according to C1) and the prediction according to C3) are thus made in parallel as illustrated in FIG. 2. The result of the first comparison of the first predicted vehicle speed $v_{pred\_acc}$ with first lower and upper limit values $v_{lim1}$ and $v_{lim2}$ in the immediately preceding simulation cycle $s_{j-1}$ determines the torque T to be used in making the second prediction of the vehicle's speed $v_{pred\_Tnew}$ during this simulation cycle $s_j$.

C4) Doing a second comparison of the second predicted vehicle speed $v_{pred\_Tnew}$ with second lower and upper limit values $v_{min}$ and $v_{max}$ which delineate a range within which the vehicle's speed should be.

C5) determining at least one reference value which indicates how the vehicle's speed is to be influenced, on the basis of said second comparison and/or the second predicted vehicle speed $v_{pred\_Tnew}$ in this simulation cycle $s_j$.

As a further step D) said at least one reference value is then supplied, e.g. by being sent via a CAN bus, to a control system of the vehicle in which it is then used to regulate the vehicle's speed according to said at least one reference value.

The method according to the present invention results in a constant and predetermined processor load when determining said at least one reference value.

The set speed $v_{set}$ is thus the driver's input signal related to a desired cruise control speed, and the at least one reference value is the value on which the vehicle is regulated. The at least one reference value is preferably a reference speed $v_{ref}$, a reference torque $T_{ref}$ or a reference engine speed $\omega_{ref}$.

The reference speed $v_{ref}$ is imparted to the speed regulator of the engine control unit. In traditional cruise control, as mentioned above, the reference speed $v_{ref}$ is equal to the set speed, i.e. $v_{ref}=v_{set}$. The speed regulator then controls the vehicle's speed on the basis of the reference speed $v_{ref}$ by demanding necessary torque from the engine's torque regulator. According to the embodiment in which the at least one reference value is a reference torque $T_{ref}$, it may be sent directly to the engine's torque regulator. In the embodiment where the at least one reference value is a reference engine speed $\omega_{ref}$, it may be sent directly to the engine's speed regulator.

There follows a description of how the various predicted speeds are determined.

The total force $F_{env}$ acting upon the vehicle from the environment is made up of rolling resistance $F_{roll}$, gravitation F and air resistance $F_{air}$. Gravitation is calculated as $$F = m \cdot g \cdot \alpha \quad \text{(eq.1)}$$

where m is the weight of the vehicle and a the gradient of the road in radians. Since mostly only small angles are concerned, $\sin(\alpha)$ is approximated to $\alpha$.

Air resistance is calculated as a factor k multiplied by the square of vehicle speed, as follows:

$$F_{env} = F_{roll,present} + m \cdot 9.82 \cdot \alpha + k \cdot v_{i-1}^2 \quad \text{(eq. 2)}$$

$$F_{roll,present} = F_{roll,est}, m = m_{est}, k = \frac{1}{2} \rho \cdot C_d \cdot A \quad \text{(eq. 3)}$$

where A is the vehicle's estimated frontal area, $C_d$ the resistance coefficient which depends on the streamline shape of the object, $\rho$ the density of the air and m the weight of the vehicle estimated by its weight estimation system as $m_{est}$. Current rolling resistance $F_{roll,present}$ is also estimated in the vehicle continuously as $F_{roll,est}$. For calculation of $m_{est}$ and $F_{roll,est}$ please refer to the dissertation entitled "Fuel Optimal Powertrain Control for Heavy Trucks Utilizing Look Ahead" by Maria Ivarsson, Linköping 2009, ISBN 978-91-7393-637-8. $v_{i-1}$ is the vehicle's predicted speed at preceding simulation step.

The force $F_{drive}$ which propels the vehicle forwards depends on which prediction is made. It is taken according to an embodiment as either a torque which accelerates the vehicle or a torque which retards the vehicle as compared with conventional cruise control.

The force $F_{drive}$ which propels the vehicle forwards may be taken as between a maximum possible force (maximum torque) and at least possible force (minimum torque, e.g. drag torque). It is possible, however, as described above, to use substantially any desired force within the range $$F_{min} \leq F_{drive} \leq F_{max} \quad \text{(eq. 4)}$$

and the first prediction $v_{pred\_Tnew\_ret}$ and the second prediction $v_{pred\_Tnew\_acc}$ of the vehicle's speed may therefore be made at torques other than maximum or minimum torque. $F_{max}$ is calculated as a maximum available engine torque, which is described as a function of engine speed, multiplied by the total transmission ratio $i_{tot}$ and divided by the effective tyre radius $r_{wheel}$. The minimum force $F_{min}$ is calculated in a similar way to the maximum force $F_{max}$ but with minimum torque instead:

$$F_{max} = \frac{T_{max}(\omega) \cdot i_{tot}}{r_{wheel}} \quad \text{(eq. 5)}$$

$$F_{min} = \frac{T_{min}(\omega) \cdot i_{tot}}{r_{wheel}} \quad \text{(eq. 6)}$$

where n is the vehicle's engine speed and $i_{tot}$ the vehicle's total transmission ratio.

The vehicle's acceleration Acc is given by $$Acc = (F_{drive} - F_{env})/m \quad \text{(eq.7)}$$

According to an embodiment, simulation steps C1-C5 during a simulation cycle $s_j$ of N steps have a constant step length which depends on the vehicle's speed. The length dP of each simulation step is given by $$dP = K \cdot v_{init} \quad \text{(eq. 8)}$$

where K is a time constant, e.g. 0.9 s, and $v_{init}$ is prevailing vehicle speed at the beginning of the simulation.

The time dt for a simulation step is given by $$dt = dP/v_{i-1} \quad \text{(eq. 9)}$$

where $v_{i-1}$ is predicted speed at preceding simulation step i-1.

The speed difference dv is $$dv = Acc \cdot dt \quad \text{(eq. 10)}$$

Energy consumed dW for a simulation step is given by $$dW = dP \cdot (F_{drive} - F_{min}) \quad \text{(eq. 11)}$$

The speed $v_i$ at current simulation step becomes $$v_i = v_{i-1} + dv \quad \text{(eq. 12)}$$

Total time $t_i$ for current simulation step is $$t_i = t_{i-1} + dt \quad \text{(eq. 13)}$$

Total energy consumed $W_i$ for current simulation step is $$W_i = W_{i-1} + dW \quad \text{(eq. 14)}$$

Figure 3:
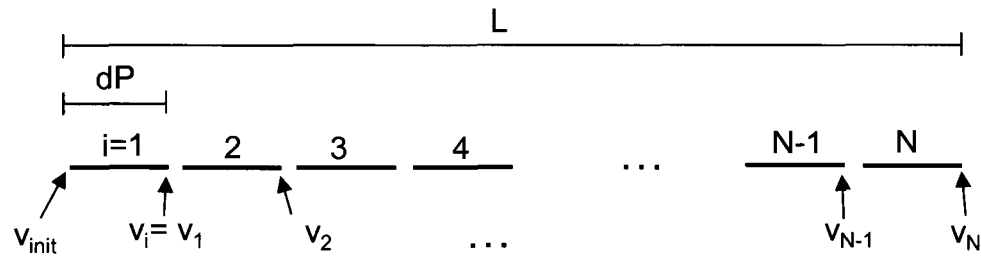
FIG. 3 illustrates a predicted speed during a simulation cycle according to an embodiment of the invention.

FIG. 3 illustrates how a vehicle speed is predicted during a simulation cycle $s_j$ of N simulation steps with a horizon which is L metres long. The prediction is discontinued after N simulation steps, i.e. after a simulation cycle $s_j$. A fresh simulation cycle $s_{j+1}$ then begins in the next time sample. Each simulation cycle $s_j$ has a predetermined frequency f. At a frequency of 100 Hz, for example, 100 simulation steps are conducted per second. As the length of each simulation step depends on the vehicle's speed $v_{init}$ at the beginning of the prediction, the length of the predicted section of the horizon varies with the vehicle's speed.

For example, at 80 km/h (22.22 m/s) the horizon becomes 2 km long if f=100 Hz and K=0.9 s, since each simulation step dP then becomes 20 m long and over 100 steps the horizon then becomes 2 km. FIG. 3 shows a fresh speed v, predicted at each simulation step i. The processor load here becomes constant and the number of simulation steps i decides how long a simulation cycle $s_j$ will taken. The number of simulation steps is determined by the rate f, which according to an embodiment is a predetermined value. The maximum processor load can therefore always be determined in advance, which is advantageous in that the processor can be dimensioned accordingly. The processor load is therefore independent of road topography, vehicle weight and engine type. According to an embodiment, the first predicted speed $v_{pted-cc}$ and the second predicted speed $v_{pred\_Tnew}$ may be vectors with N values each, or alternatively only maximum and minimum values for the first predicted speed and second predicted speed may be saved in each simulation cycle $s_j$.

Figure 4:
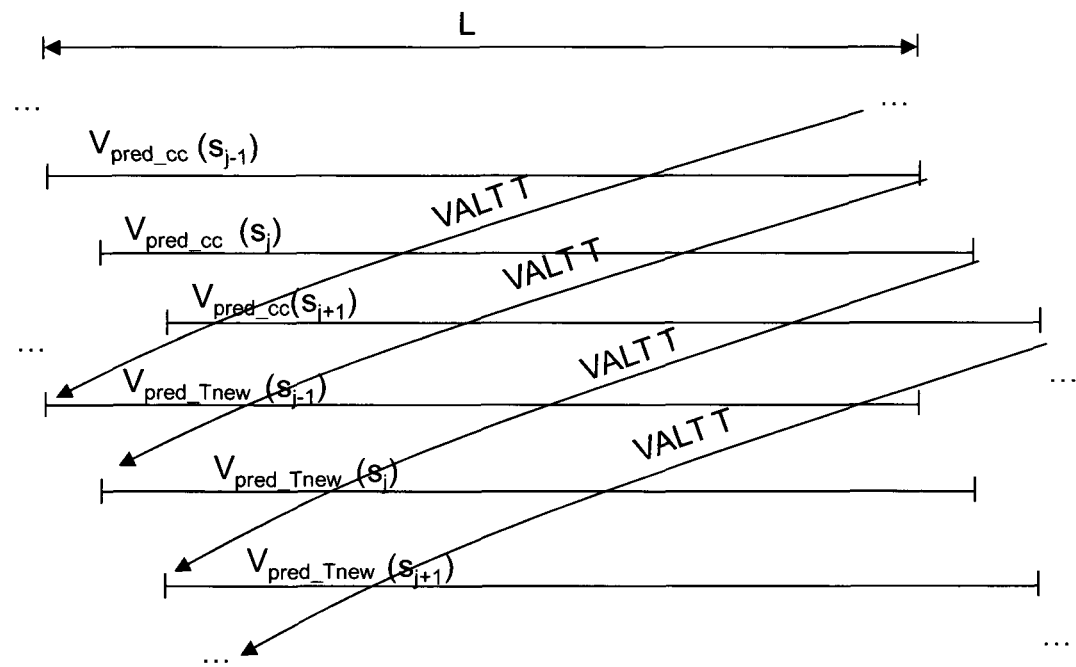
FIG. 4 illustrates a number of simulation cycles according to an embodiment of the invention.

FIG. 4 illustrates three simulation cycles $s_{j-1}$, $s_j$ and $s_{j+1}$ and the predictions made during each of them. The first predicted vehicle speed $v_{pred\_cc}$ and the second predicted vehicle speed $v_{pred\_Tnew}$ are predicted in each simulation cycle. After each simulation cycle, the first predicted vehicle speed $v_{pred\_cc}$ is compared with the first lower and upper limit values $v_{lim1}$ and $v_{lim2}$ and the result of this comparison is used as a basis for determining the torque T to be used in determining the second predicted vehicle speed $v_{pred\_Tnew}$ for the next simulation cycle, as described above and also illustrated in FIG. 4 by arrows marked "valt T". This is also illustrated at steps C2 and C3 in the flowchart in FIG. 2, in which a torque T is determined at step C2 during this simulation cycle $s_j$ and is then supplied to step C3 in the next simulation cycle $s_{j+1}$. This is also illustrated at step S2 in FIG. 6, followed by respective steps S21 and S31 depending on the magnitude of the first predicted vehicle speed $v_{pred\_cc}$ In other words, step C3 during simulation cycle $s_j$ is based on a torque T determined during the preceding simulation cycle $s_{j-1}$.

Two different vehicle speeds are thus predicted during each simulation cycle, viz. the first predicted vehicle speed $v_{pred\_cc}$ and the second predicted vehicle speed $v_{pred\_Tnew}$.

As described and exemplified in more detail below, according to an embodiment of the invention, after a simulation cycle $s_j$ the second predicted vehicle speed $v_{pred\_Tnew}$ is compared with at least one of the second lower and upper limit values $v_{min}$ and $v_{max}$. Here at least one of a set of rules is used to determine the value of the at least one reference value.

According to an embodiment, such a rule is that the reference value is taken as the value for the set speed $v_{set}$. If in this comparison the second predicted vehicle speed $v_{pred\_Tnew}$ is below the second lower limit value $v_{min}$ or above the second upper limit value $v_{max}$, the vehicle has to be controlled on the set speed $v_{set}$, i.e. the reference value has to be taken as the value for the set speed $v_{set}$. This is illustrated at step S3 in FIG. 6, which is reached if the result of the comparison at either of steps S22 and S32 is "NO".

If on the contrary the result of either of the comparisons at steps S23 and S32 is "YES", the respective acceleration or retardation is evaluated at step S23 or S33. Thus if for example the second predicted vehicle speed $v_{pred\_Tnew}$ is within the range defined by the second lower and upper limit values $v_{min}$ and $v_{max}$ or is equal to either of these limit values, the method moves on to the respective step S23 or S33 in FIG. 6.

Therefore, if instead the second predicted vehicle speed $v_{pred\_Tnew}$ based on a retardation is not below the second limit value $v_{min}$, the method moves on to step S33 in which the retardation (the lowering of the speed) is evaluated.

At step S33, according to an embodiment, the reference speed $v_{ref}$ is determined to a value which represents the second predicted vehicle speed $v_{pred\_Tnew}$ if a minimum value for the latter is equal to or above the second lower limit value $v_{min}$ and if also a maximum value for it is equal to or above a further upper limit value $v_{max2}$ which is related to a set speed $v_{set}$. According to an embodiment, the further upper limit value $v_{max2}$ corresponds to the set speed plus a constant $c_1$, i.e. $v_{max2}=v_{set}+c_1$ According to another embodiment, the further upper limit value $v_{max2}$ corresponds to a factor $c_1$ multiplied by the set speed, i.e. $v_{max2}=v_{set}*c_1$. This factor $c_1$ may for example have the value 1.02, meaning that the further upper limit value $v_{max2}$ is 2% higher than the set speed $v_{set}$.

At step S33, according to an embodiment, the reference speed $v_{ref}$ is determined to a value which corresponds to the set speed $v_{set}$ if the second predicted vehicle speed $v_{pred\_Tnew}$ based on a retardation is below the second lower limit value $v_{min}$ and/or below the further upper limit value $v_{max2}$.

According to an embodiment, step S33 determines the reference speed $v_{ref}$ to a value which corresponds to the second lower limit value $v_{min}$ if a smallest value for the second predicted vehicle speed $v_{pred\_Tnew}$ based on a retardation is above or equal to the second lower limit value $v_{min}$ and if a largest value for the second predicted vehicle speed $v_{pred\_Tnew}$ based on a retardation is above or equal to the further upper limit value $v_{max2}$. This is illustrated schematically in FIG. 9.

If instead the second predicted vehicle speed $v_{pred\_Tnew}$ based on an acceleration is not below the lower limit value $v_{min}$, the method moves on to step S23, in which the acceleration (the raising of the speed) is evaluated.

At step S23, according to an embodiment, the reference speed $v_{ref}$ is determined to a value which represents the second predicted vehicle speed $v_{pred\_Tnew}$ if a maximum value for the latter is equal to or below the upper limit value $v_{max}$ and if also a minimum value for it is equal to or below a further lower limit value $v_{min2}$ which is related to a set speed. According to an embodiment, the further lower limit value $v_{min2}$ corresponds to the set speed $v_{set}$ minus a constant $c_2$, i.e. $v_{min2}=v_{set}-c_2$ According to another embodiment, the further lower limit value $v_{min2}$ corresponds to a factor $c_2$ multiplied by the set speed, i.e. $v_{min2}=v_{set}*c_2$. This factor $c_2$ may for example have the value 0.98, meaning that the further upper limit value $v_{max2}$ is 2% lower than the set speed $v_{set}$.

According to an embodiment, step S23 determines the reference speed $v_{ref}$ to a value which corresponds to the set speed $v_{set}$ if the second predicted vehicle speed $v_{pred\_Tnew}$ based on an acceleration is above the upper limit value $v_{max}$ and/or above the further lower limit value $v_{min2}$.

At step S23, according to an embodiment, the reference speed $v_{ref}$ is determined to a value which corresponds to the second upper limit value $v_{max}$ if the second predicted vehicle speed $v_{pred\_Tnew}$ based on an acceleration is below or equal to the second upper limit value $v_{max}$ and if a smallest value for this second predicted speed is below or equal to the further lower limit value $v_{min2}$. According to an embodiment of the invention, the reference speed $v_{ref}$ may here also be ramped up towards a value which corresponds to the further upper limit value $v_{max2}$.

Each simulation cycle $s_j$ is thus followed by determining whether it is the set speed $v_{set}$, the second predicted vehicle speed $v_{pred\_Tnew}$ or some other value which is to influence the vehicle's speed. Reference values representing the speed determined, which may take the form of a reference vehicle speed, a reference torque or a reference engine speed are then imparted to a control unit for use in controlling the vehicle's speed.

The one or more reference values which the vehicle's control system is to work on are determined continuously when the vehicle is in motion. They are preferably determined as from a certain predetermined distance ahead of the vehicle and are then synchronised in the control unit so that a calculated reference value for a given situation is set at the right time. An example of such a distance is 50 metres, which the control unit therefore caters for in regulating the vehicle.

An embodiment according to the invention will now be explained with reference to FIGS. 5 and 6. The top part of FIG. 5 illustrates the first predicted vehicle speed $v_{pred\_cc}$ (thick line) which would be arrived at by a conventional cruise control along a horizon with a road profile such as depicted in the lower part of FIG. 5.

Figure 6:
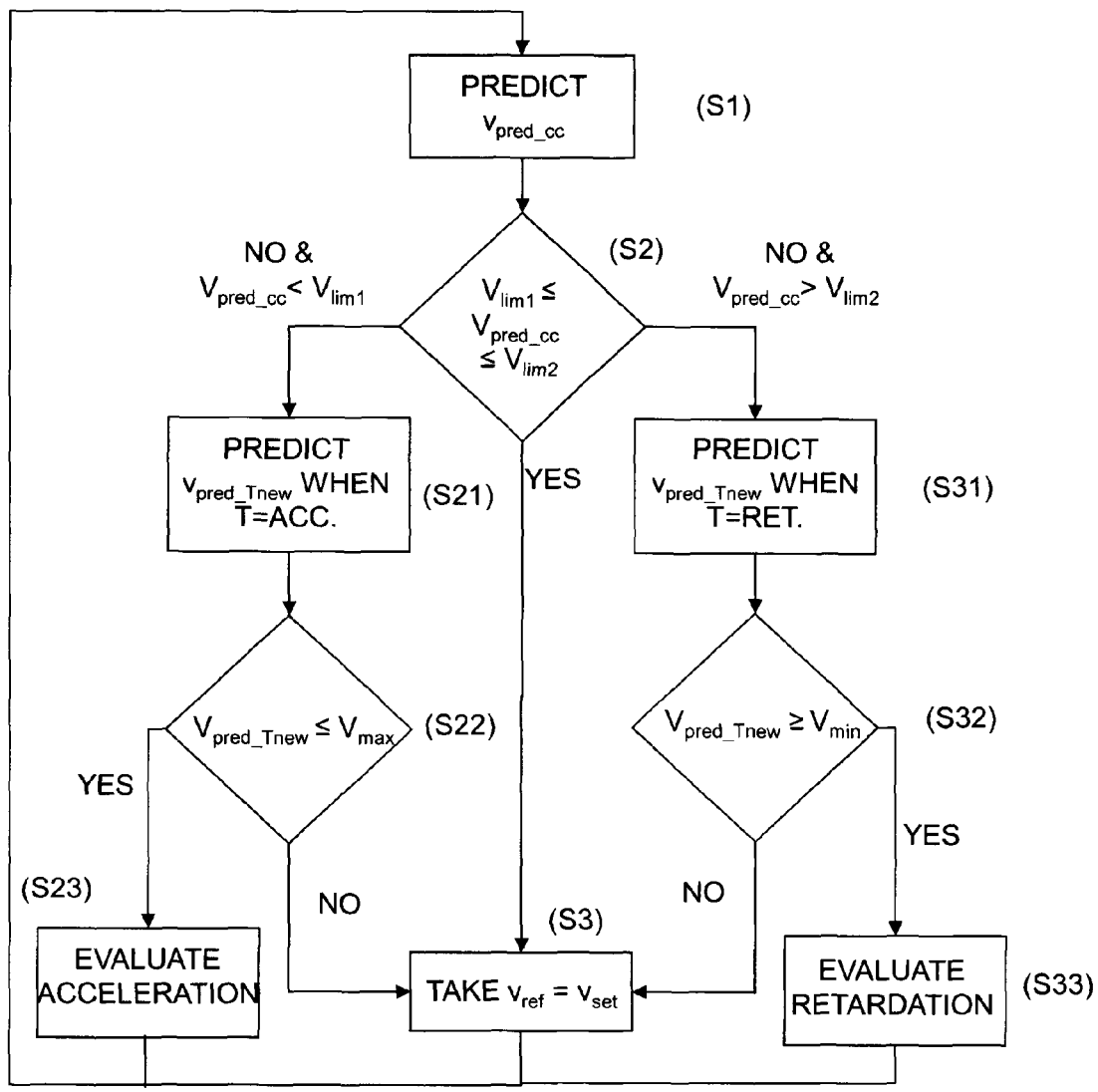
FIG. 6 illustrates a flowchart for the method according to an embodiment of the invention.

The flowchart in FIG. 6 shows how the first predicted vehicle speed $v_{pred\_cc}$ is predicted at a first step S1. When it has been predicted for N steps, the first predicted speed $v_{pred\_cc}$ is compared with the first lower and upper limit values $v_{lim1}$ and $v_{lim2}$, as depicted at a second step S2. If the first predicted speed $v_{pred\_cc}$ is below the first lower limit value $v_{lim1}$ an upgrade is identified, but if it is above the first upper limit value $v_{lim2}$ a downgrade is identified.

If an upgrade is identified, i.e. if the first predicted speed $v_{pred\_cc}$ goes below the first lower limit value $v_{lim1}$, as at P1 in FIG. 5, the vehicle's engine torque T in the prediction of the second predicted vehicle speed $v_{pred\_Tnew}$ is taken as a torque which accelerates the vehicle (e.g. a maximum torque) in the next simulation cycle $s_{j+1}$. This is illustrated at step S21 in FIG. 6, see also equation 5, and is depicted as a broken line in FIG. 5. This does however presuppose that the first predicted speed $v_{pred\_cc}$ was below the first lower limit value $v_{lim1}$ before potentially going above the first upper limit value $v_{lim2}$.

Figure 5:
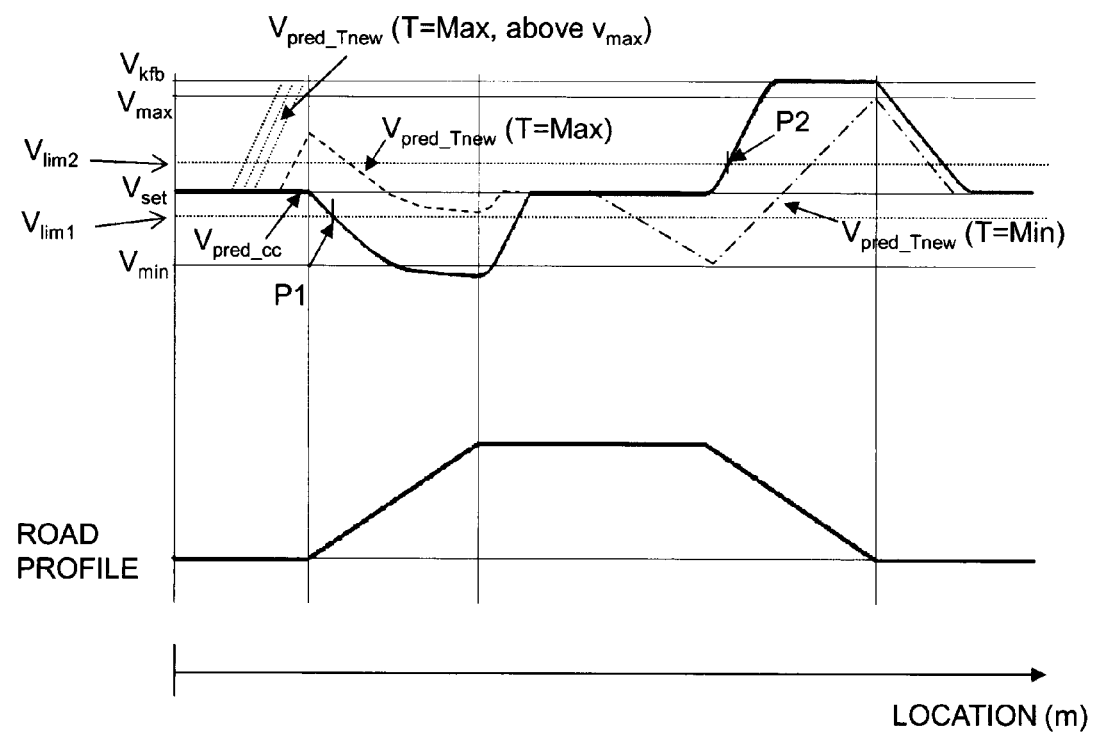
FIG. 5 illustrates the vehicle's predicted speeds according to an embodiment of the invention.

If on the contrary a downgrade is identified, i.e. if the first predicted speed $v_{pred\_cc}$ goes above the first upper limit value $v_{lim2}$, as at P2 in FIG. 5, the vehicle's engine torque T in the prediction of the second predicted vehicle speed $v_{pred\_Tnew}$ is taken as a torque which retards the vehicle (e.g. a minimum torque) in the next simulation cycle $s_{j+1}$. This is illustrated at step S31 in FIG. 6, see also equation 6, and is depicted as a broken line in FIG. 5. This does however presuppose that the first predicted speed $v_{pred\_cc}$ was above the first upper limit value $v_{lim2}$ before potentially going below the first lower limit value $v_{lim1}$. According to an embodiment, the calculation unit explained above with reference to FIG. 1 is adapted to doing the calculations and comparisons here described.

According to a preferred embodiment of the invention described above, if a hill is identified by the analysis described above of the first predicted speed $v_{pred\_cc}$, specific rules are applied to determine which one or more reference values the vehicle is to be regulated on. According to this embodiment, the calculation unit is adapted to using rules for determining the at least one reference value.

According to an embodiment of the invention, the second predicted vehicle speed $v_{pred\_Tnew}$ is compared with the second lower and upper limit values $v_{min}$ and $v_{max}$ which define a range within which the vehicle's speed should be. These comparisons are done at steps S22 and S32 in FIG. 6.

According to an embodiment of the invention, such a rule is that if the second predicted vehicle speed $v_{pred\_Tnew}$ is within the range defined by the second lower and upper limit values, i.e. if $v_{min} \leq v_{pred\_Tnew} \leq v_{max}$, the method moves on to steps S23 and S33 respectively, in which the vehicle's imparted reference value is determined as a value which represents the second predicted speed $v_{pred\_Tnew}$. It is thus possible to ensure that the vehicle's speed will not be above or below the respective speed limits defined by the second lower and upper limit values $v_{min}$ and $v_{max}$.

In the upper part of FIG. 5 three dotted lines illustrate how $v_{pred\_Tnew}$ is predicted with an accelerating torque and is then also predicted to be above the second upper limit value $v_{max}$. As this scenario is undesirable in that the vehicle's speed will exceed the speed limit $v_{max}$, the set speed $v_{set}$ is imparted as reference value, as at step S3 in FIG. 6. Only when the second predicted vehicle speed $v_{pred\_Tnew}$ is predicted not to be above the second upper limit value $v_{max}$ may a reference value which represents the second predicted vehicle speed $v_{pred\_Tnew}$ be imparted according to step S23 in FIG. 6.

This is also illustrated in the flowchart in FIG. 6. If predicted with an accelerating torque at step S21, the second predicted vehicle speed $v_{pred\_Tnew}$ is then compared with the second upper limit value $v_{max}$ at a step S22. According to an embodiment of the invention, if it is below or equal to the second upper limit value $v_{max}$, the second predicted speed $v_{pred\_Tnew}$ is imparted as reference value at step S23. The second predicted speed $v_{pred\_Tnew}$ is then preferably imparted as reference value at the time P1 when the first predicted speed $v_{pred\_cc}$ goes below the first lower limit value $v_{min1}$, provided that it is predicted not to go above the second upper limit value $v_{max}$.

Similarly, the second predicted vehicle speed $v_{pred\_Tnew}$ is compared with the second lower limit value $v_{min}$ at a step S32 if it is predicted on the basis of a retarding torque. According to an embodiment of the invention, if it is above or equal to the second lower limit value $v_{min}$, the second predicted vehicle speed $v_{pred\_Tnew}$ is imparted as reference value at step S33. The second predicted vehicle speed $v_{pred\_Tnew}$ is thus preferably imparted at the time when the first predicted speed $v_{pred\_cc}$ is above the second upper limit value $v_{max}$, provided that it is predicted not to go below the second lower limit value $v_{min}$.

In the next simulation cycle, the method begins again from S1. The time for performing the calculations, i.e. the predetermined rate f, is adjusted so that the whole method is gone through during a simulation cycle $s_j$.

For the vehicle to be retarded or accelerated (reach minimum torque or maximum torque), it is possible, according to an embodiment of the invention, for the at least one reference value, e.g. the reference speed $v_{ref}$, to be imparted with an offset. Minimum torque may than for example be imparted by giving the reference speed $v_{ref}$ a low value below the lower limit value $v_{min}$. For example, the reference speed $v_{ref}$ may be given the value $v_{min}-k_1$, in which $k_1$ is within the range 1-10 km/h. The engine's control unit will then demand drag torque from the engine. In a similar way, maximum torque may be reached by giving the reference speed $v_{ref}$ a high value above the second upper limit value $v_{max}$. For example, the reference speed $v_{ref}$ may be given the value $v_{max}+k_2$, in which $k_2$ is within the range 1-10 km/h.

According to an embodiment of the invention, the highest first predicted speed $v_{pred\_cc,max}$ and the lowest first predicted speed $v_{pred\_cc,min}$ are determined during the first prediction of the vehicle's speed $v_{pred\_cc}$ according to a conventional cruise control and are then used in the first comparison with the respective first lower and upper limit values $v_{lim1}$ and $v_{lim2}$ to determine the vehicle's engine torque T in the second prediction. According to this embodiment, the calculation unit is adapted to performing these calculations. Using this embodiment, only scalars need be saved, not whole vectors, thereby saving memory space. Nor need the values be saved after they have been used in the simulation cycle $s_j$, since no adjustment of reference values rearwards in the horizon takes place, which means that the values will not be used again for calculations after this simulation cycle $s_j$. This difference compared with previous known calculation algorithms saves processor power and helps to achieve a constant processor load. Similarly, the respective highest and lowest speeds for the prediction of the second predicted vehicle speed $v_{pred\_Tnew}$ may be determined during a simulation cycle $s_j$.

According to an embodiment of the invention, the reference value, e.g. the reference speed $v_{ref}$, is taken as the second lower limit value $v_{min}$ or the second upper limit value $v_{max}$. This embodiment is an alternative to those described above which use hysteresis or addition of a constant offset $k_1$ or $k_2$ to the reference value. This embodiment may therefore be used to avoid jerky regulation or to achieve a certain low or high torque. It results in less sensitivity to potential errors in the speed predictions and avoids driver dissatisfaction by neither going below the second lower limit value $v_{min}$ nor above the second upper limit value $v_{max}$.

An embodiment of the invention takes into account the efficiency of the power train (i.e. the engine, gearbox and final gear) and comfort/drivability when predicting the second predicted vehicle speed $v_{pred\_Tnew}$, i.e. when choosing control strategies which are to be predicted when the second predicted vehicle speed $v_{pred\_Tnew}$ is determined. Determining the torque T in terms of magnitude and/or time according to the engine's efficiency or on the basis of comfort requirements, resulting in different magnitudes of the second predicted vehicle speed $v_{pred\_Tnew}$, makes it possible to achieve comfortable and economical cruise control. This embodiment may be implemented on the basis of rules, e.g. that the engine has to have a certain torque at a certain engine speed or that torque which results in more acceleration than a certain limit value is never allowed.

We have described above how various rules may be used to decide which at least one the reference value the vehicle is to be regulated on. Embodiments described below use instead cost functions to decide which at least one reference value the vehicle is to be regulated on. FIG. 6 shows the respective calculations based on these cost functions at steps S23 and S33. How the cost functions are used in determining the at least one reference value will therefore be described in detail below in relation to further embodiments of the present invention.

Figure 7:
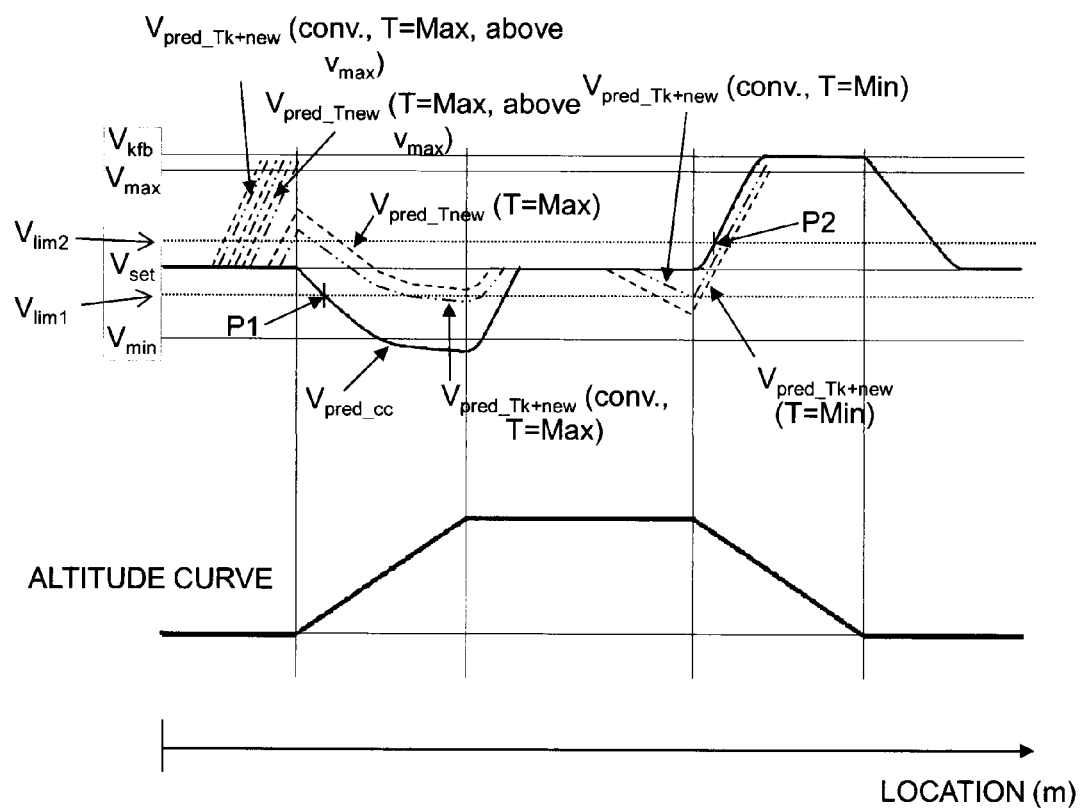
FIG. 7 illustrates the vehicle's predicted speeds according to an embodiment of the invention.

An embodiment according to the invention will now be explained with reference to FIG. 7, partly corresponding to FIG. 5 described above. In FIG. 7 (as in FIG. 5) the upper part illustrates the first predicted speed $v_{pred\_cc}$ (thick line) which would be arrived at by a conventional cruise control along a horizon with a road profile such as depicted in the lower part of FIG. 7.

When it has been predicted, the first predicted speed $v_{pred\_cc}$ is compared with the first lower and upper limit values $v_{lim1}$ and $v_{lim2}$. If it is below the first lower limit value $v_{lim1}$ an upgrade is identified, but if it is above the first upper limit value $v_{lim2}$ a downgrade is identified.

If an upgrade is identified, i.e. if the first predicted speed $v_{pred\_cc}$ is below the first lower limit value $v_{lim1}$, as at P1 in FIG. 7, the vehicle's engine torque T in the prediction of the second predicted vehicle speed $v_{pred\_Tnew}$ is taken as a torque which accelerates the vehicle (maximum torque) in the next simulation cycle $s_{j+1}$. This is illustrated as a broken line in FIG. 7. This does however presuppose that the first predicted speed $v_{pred\_cc}$ was below the first lower limit value $v_{lim1}$ before potentially going above the first upper limit value $v_{lim2}$.

If on the contrary a downgrade is identified, i.e. if the first predicted speed $v_{pred\_cc}$ is above the first upper limit value $v_{lim2}$, as at P2 in FIG. 7, the vehicle's engine torque T in the prediction of the second predicted vehicle speed $v_{pred\_Tnew}$ is taken as a torque which retards the vehicle (minimum torque) in the next simulation cycle $s_{j+1}$. This is illustrated as a broken line in FIG. 7. This does however presuppose that the first predicted speed $v_{pred\_cc}$ was above the first upper limit value $v_{lim2}$ before, where applicable, it goes below the first lower limit value $v_{lim1}$. According to an embodiment, the calculation unit explained above with reference to FIG. 1 is adapted to doing the calculations and comparisons here described.

If the first predicted speed $v_{pred\_cc}$ is above or equal to the first lower limit value $v_{lim1}$ and below or equal to the first upper limit value $v_{lim2}$, the reference value is taken to be a reference speed equal to the set speed $v_{set}$, as illustrated at step S2 followed by step S3 in FIG. 6. The set speed $v_{set}$ is thus imparted as reference value if the first predicted speed $v_{pred\_cc}$ does not go outside the range defined by the first lower and upper limit values $v_{lim1}$, $v_{lim2}$. This may for example mean that no hill is identified, in which case the first predicted speed $v_{pred\_cc}$ is outside the range bounded by the first lower and upper limit values $v_{lim1}$, $v_{lim2}$. This may therefore mean that the vehicle will travel on a level road. The set speed $v_{set}$ then becomes the reference value on which the vehicle's control system is to be regulated. The second predicted speed $v_{pred\_Tnew}$ is preferably still predicted with maximum or minimum torque in order to achieve the advantageous uniform processor load.

According to an embodiment of the present invention, at least one further prediction of the vehicle's speed $v_{pred\_Tk+new}$ along the horizon is made in each simulation cycle $s_j$. According to an embodiment of the invention, a total of three different predictions of the vehicle's speed are made here, viz. $v_{pred\_cc}$, $v_{pred\_Tnew}$, $v_{pred\_Tk+new}$. Each of the at least one further prediction of the vehicle's speed $v_{pred\_Tk+new}$ is based on a torque which is required to increase the vehicle's speed above the first predicted speed $v_{pred\_cc}$, or on a torque which is required to lower the vehicle's speed below the first predicted speed $v_{pred\_cc}$, in which case the torque on which the at least one further prediction is based depends on said first comparison in the immediately preceding simulation cycle $s_{j-1}$.

According to an embodiment, each simulation cycle $s_j$ therefore also makes a further, e.g. a third, prediction of the vehicle's speed $v_{pred\_Tk+new}$ along the horizon, resulting in a total of three different predictions, viz. $v_{pred\_cc}$, $v_{pred\_Tnew}$, $v_{pred\_Tk+new}$. The first predicted speed $v_{pred\_ee}$ conforms to what a conventional cruise control would predict and is followed by predicting the second predicted speed $v_{pred\_Tnew}$ and the third predicted vehicle speed $v_{pred\_Tk+new}$, when the vehicle's engine torque T is taken as a maximum torque, a minimum torque or some other torque, see equation 4, which results in an alternative mode of driving, depending on said first comparison in the immediately preceding simulation cycle $s_{j-1}$. This third predicted vehicle speed $v_{pred\_Tk+new}$ is represented by a chain-dotted line in FIG. 7.

According to an embodiment, similar criteria are used for deciding when and at what torque T the second predicted vehicle speed $v_{pred\_Tnew}$ is to be predicted, and also for deciding when and at what torque T the third predicted vehicle speed $v_{pred\_Tk+new}$ is to be predicted.

According to an embodiment, other criteria are used for determining another torque T which results in an alternative mode of driving, in order to decide when and at what torque T the third predicted vehicle speed $v_{pred\_Tk+new}$ is to be predicted, e.g. when particular comfort requirements are desired. Predicting the third predicted vehicle speed $v_{pred\_Tk+new}$ preferably comprises first doing one or more simulation steps by using the function of a conventional cruise control, followed by doing the remainder of the simulation steps with another torque T than that of the conventional cruise control, e.g. maximum or minimum torque as described above. For example, simulation steps 1 to 4 in FIG. 3 may be performed by using a conventional cruise control, followed by performing simulation steps 5 to N with accelerating or retarding torque.

The various chain-dotted lines in the upper part of FIG. 7 illustrate how the third predicted vehicle speed $v_{pred\_Tk+new}$ is predicted to go above the second upper limit value $v_{max}$. As this scenario is undesirable, the reference value is determined to be equal to the set speed $v_{set}$. Only when neither the third predicted vehicle speed $v_{pred\_Tk+new}$ nor the second predicted speed $v_{pred\_Tnew}$ is predicted to go above the second upper limit value $v_{max}$ may this mode of driving be applicable for comparison with a cost function according to a version of the present invention. This is described in more detail below in relation to equations 15 and 16.

According to an embodiment of the invention, if the second predicted vehicle speed $v_{pred\_Tnew}$ is above or below limit values set directly or indirectly by the driver, e.g. the second lower and upper limit values $v_{min}$ and $v_{max}$, the reference value is determined to be equal to the set speed $v_{set}$, as illustrated by steps S22, S32 and S3 in FIG. 6.

According to that embodiment, three predictions of the vehicle's speed $v_{pred\_cc}$, $v_{pred\_Tnew}$, $v_{pred\_Tk+new}$ with different control strategies are thus made for a limited portion of the route ahead of the vehicle, a portion of length L, also called the horizon. According to an embodiment of the invention, each such prediction then preferably involves calculating the vehicle's speed profile v, total energy consumption $E_N$ and journey time $t_N$. According to an embodiment, maximum and minimum speeds are also calculated for the predictions, as described below in more detail. The total energy consumption $E_N$ for a predicted speed during a simulation cycle is calculated by using equation 14. The total time $t_N$ for a predicted speed during the simulation cycle is similarly calculated by equation 13. The prediction of the first predicted vehicle speed $v_{pred\_cc}$ by a conventional cruise control gives the total energy consumption designated $E_{pred\_cc}$ and the total journey time designated $t_{pred\_cc}$ and decides which of the other control strategies/modes of driving are to be predicted, in a similar way to that described above.

The total time $t_{LA\_Tnew}$ and the total energy consumption $E_{LA\_Tnew}$ are calculated during each simulation cycle for the second predicted speed $v_{pred\_Tnew}$. The third predicted vehicle speed $v_{pred\_Tk+new}$ is also predicted as described above, and the total time $t_{LA\_Tk+new}$ and the total energy consumption $E_{LA\_Tk+new}$ for the third predicted vehicle speed $v_{pred\_Tk+new}$ are calculated during a simulation cycle.

According to an embodiment of the invention, the speed predictions are evaluated by calculating the cost for the second predicted vehicle speed $v_{pred\_Tnew}$ and/or a third predicted vehicle speed $v_{pred\_Tk+new}$ by use of at least one cost function $J_{Tnew}$, $J_{Tk+new}$. It is thus possible on the basis of the cost for these second and third predictions of the vehicle speed/control strategy to evaluate which of the predictions of the vehicle speeds/control strategies is best for the particular case, making it possible to choose an appropriate predicted vehicle speed/control strategy.

The calculation unit described above is preferably adapted to performing these calculations. According to an embodiment, the costs $J_{Tnew}$ and $J_{Tk+new}$ for the mode of driving according to the second prediction $v_{pred\_Tnew}$ and third prediction $v_{pred\_Tk+new}$ of the vehicle speed are determined by weighting their respective energy reductions and journey time reductions relative to corresponding respective reductions for the mode of driving according to the first predicted vehicle speed $v_{pred\_cc}$ with a weighting parameter β according to the cost functions $$J_{Tnew} = \frac{E_{LA,Tnew}}{E_{pred\_cc}} + \beta \frac{t_{LA,Tnew}}{t_{pred\_cc}} \quad \text{(eq. 15)}$$

$$J_{Tk+new} = \frac{E_{LA,Tk+new}}{E_{pred\_cc}} + \beta \frac{t_{LA,Tk+new}}{t_{pred\_cc}} \quad \text{(eq. 16)}$$

The cost functions $J_{Tnew}$ and $J_{Tk+new}$ are thus standardised with respect to the vehicle's predicted mode of driving according to the conventional cruise control $E_{pred\_cc}$ and $t_{pred\_cc}$). The cost estimations are therefore independent of, for example, the vehicle's weight. They are based solely on energy consumption and journey time, and the calculations take no account of the vehicle's fuel consumption. This means that there is no need for any model of the engine's efficiency, thereby simplifying the calculations when evaluating which control strategy is the most advantageous.

The weighting parameter β also depends very little on vehicle weight, distance traveled and engine type. The introduction of modes or setting facilities for controlling the vehicle speed is thus simplified. According to an embodiment, the driver or the system may for example choose whether to give priority to reducing fuel consumption or reducing journey time by altering the weighting parameter β. This function may be presented to the driver in a user interface, e.g. in the vehicle's instrument panel, in the form of the weighting parameter β or a parameter which depends on the weighting parameter β.

According to an embodiment of the invention, the costs for the cost functions $J_{Tnew}$ and $J_{Tk+new}$ for the second predicted vehicle speed $v_{pred\_Tk\_new}$ and for the third predicted vehicle speed $v_{pred\_Tk+new}$ are subjected to a fourth comparison which is then used as a basis for determining which reference value the vehicle is to be regulated on, i.e. the reference value is determined on the basis of this fourth comparison. Whichever of the second and third predictions of the vehicle speed results in the least cost is then used as reference value, i.e. the reference value taken is whichever of these second and third predicted vehicle speeds results in least cost. This is done in this embodiment at step S23 for acceleration and at step S33 for retardation (FIG. 6). According to an embodiment, in a way similar to that described above, the at least one reference value, e.g. the reference speed $v_{ref}$ is here imparted with an offset for the vehicle to be retarded or accelerated (to reach minimum torque or maximum torque). Minimum torque may then for example be imparted by giving the reference speed $v_{ref}$ a low value, below the second lower limit value $v_{min}$, whereas maximum torque may be achieved by giving the reference speed $v_{ref}$ a high value, above the second upper limit value $v_{max}$.

According to an embodiment of the invention, the highest first predicted speed $v_{pred\_cc,max}$ and lowest first predicted speed $v_{pred\_cc,min}$ are determined during the first prediction of the vehicle's speed $v_{pred\_cc}$ according to a conventional cruise control and are then used in the first comparison with the respective first lower and upper limit values $v_{lim1}$ and $v_{lim2}$ to determine the vehicle's engine torque T not only in the second prediction but also in the third. According to this embodiment, the calculation unit is adapted to performing also these calculations, in which only scalars need to be saved during the actual simulation cycle $s_j$ and can thereafter be deleted, resulting in a substantially constant processor load.

Figure 8:
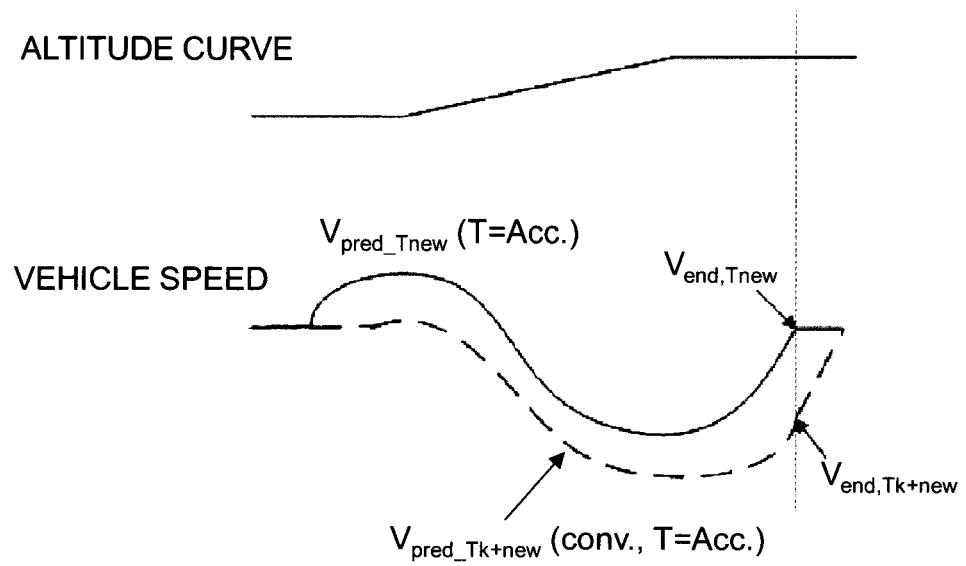
FIG. 8 illustrates different final speeds for various predictions of the vehicle's speeds according to an embodiment of the invention.
Figure 9:
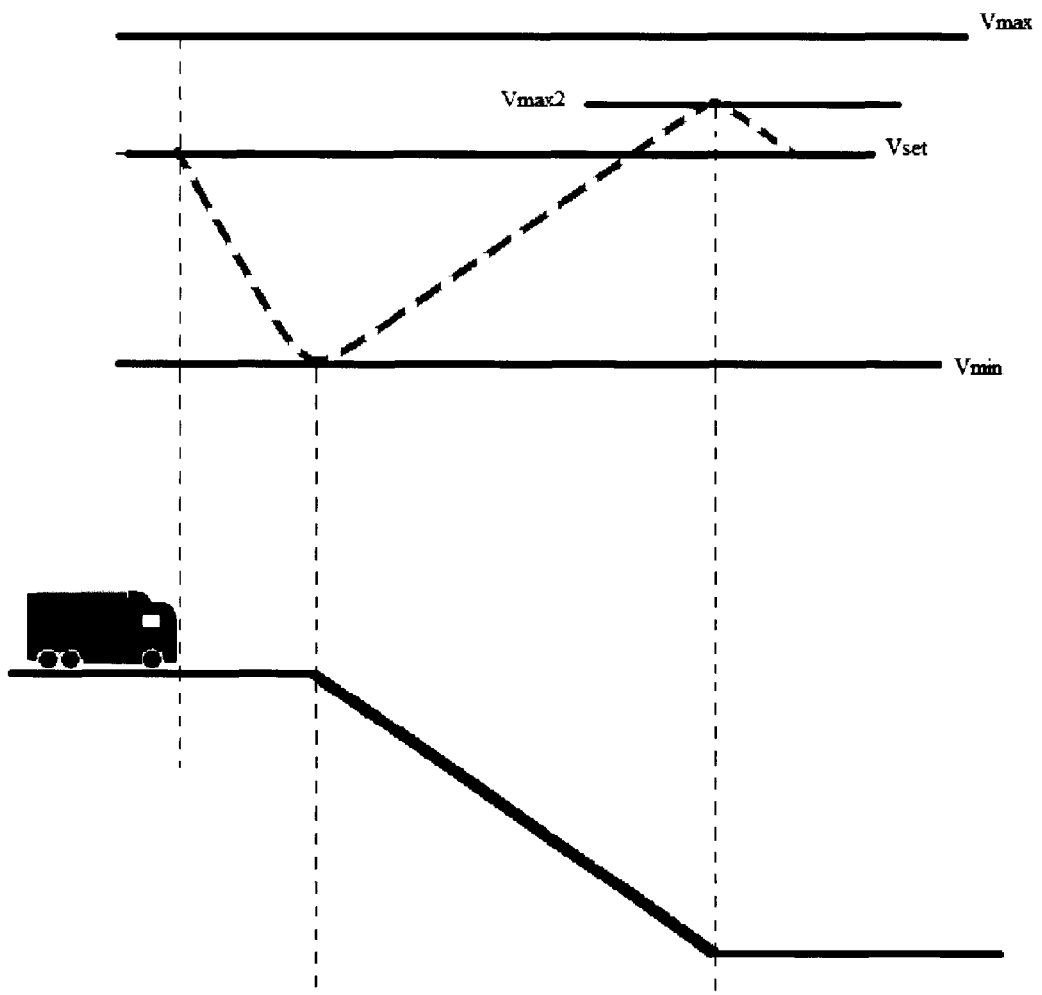
FIG. 9 illustrates the vehicle's predicted speeds according to an embodiment of the invention.

The various control strategies, i.e. the various predicted vehicle speeds $v_{pred\_Tnew}$ and $v_{pred\_Tk+new}$, often have the same final speed at the end of the horizon, and according to an embodiment this is catered for in the evaluation of the costs of the control strategies. This is illustrated in FIG. 9, in which the second predicted vehicle speed $v_{pred\_Tnew}$ is predicted with maximum torque and the third predicted vehicle speed $v_{pred\_Tk+new}$ is predicted according to a conventional cruise control in a number of simulation steps and then with maximum torque. The second predicted vehicle speed $v_{pred\_Tnew}$ results in a higher final speed $v_{end,Tnew}$ than the final speed $v_{end,Tk+new}$ for the third predicted vehicle speed $v_{pred\_Tk+new}$, since the third predicted vehicle speed $v_{pred\_Tk+new}$ initially resembles a conventional cruise control, with the result that the speed in this case does not increase as much as for the second predicted vehicle speed $v_{pred\_Tnew}$, since the maximum torque is here applied in later simulation steps than in the prediction of the second vehicle speed. However, the simulation cycle $s_j$ here ends after a number N of steps (depicted as a broken vertical line in FIG. 8), at which stage the final speeds for the respective predictions are also arrived at.

According to an embodiment, a penalty is added to at least one of the cost functions $J_{Tnew}$, $J_{Tk+new}$ if the second predicted vehicle speed $v_{pred\_Tnew}$ and the third predicted vehicle speed $v_{pred\_Tk+new}$ reach different final speeds. The amount of the penalty may be calculated on the basis of the energy consumption $E_\gamma$ and the journey time $t_\gamma$ which would be required to move the third prediction's final speed $v_{end,Tk+new}$ along the horizon to the final speed $v_{end,Tnew}$ for the second prediction and at the same time to cause both predictions to cover the same distance.

The cost functions will then resemble $$J_{Tnew} = \frac{E_{LA,Tnew} + E_{\gamma,Tnew}}{E_{pred\_cc}} + \beta \frac{t_{LA,Tnew} + t_{\gamma,Tnew}}{t_{pred\_cc}} \quad \text{(eq. 17)}$$

$$J_{Tk+new} = \frac{E_{LA,Tk+new} + E_{\gamma,Tk+new}}{E_{pred\_cc}} + \beta \frac{t_{LA,Tk+new} + t_{\gamma,Tk+new}}{t_{pred\_cc}} \quad \text{(eq. 18)}$$

Arriving at the energy consumption $E_\gamma$ and journey time $t_\gamma$, involves a number of calculations based on Newton's second law, supposing a constant running resistance in the case where $F_{env}$ is constant, i.e. it is here assumed that the road is level and that the air resistance and rolling resistance do not depend on the vehicle speed:

$$m\dot{v} = (F_{drive} - F_{env}) \quad \text{(eq. 19)}$$

On these assumptions, the vehicle speed becomes a linear function of time.

The journey time for the third prediction to move from $v_{end,Tk+new}$ to $v_{end,Tnew}$ becomes $$t_{\gamma,Tk+new} = (v_{end,Tnew} - v_{end,Tk+new}) \frac{m}{F_{drive} - F_{env}} \quad \text{(eq. 20)}$$

The distance traveled by the vehicle is $$s_\gamma = \frac{F_{drive} - F_{env}}{2m} t_{\gamma,Tnew}^2 + v_{end,Tk+new} \cdot t_{\gamma,Tk+new} \quad \text{(eq. 21)}$$

The energy requirement is $$E_{\gamma,Tk+new} = F_{driv} \cdot s_\gamma \quad \text{(eq. 22)}$$

The journey time for the second prediction to cover the same distance $s_\gamma$ with no change in the speed $v_{end,Tnew}$ is $$t_{\gamma,Tnew} = \frac{s_\gamma}{v_{end,Tk+new}} \quad \text{(eq. 23)}$$

The energy requirement is $$E_{\gamma,Tnew} = F_{env} \cdot s_\gamma \quad \text{(eq. 24)}$$

If $v_{end,Tk+new} < v_{end,Tnew}$ a maximum torque ($F_{drive} = F_{max}$) is used, and if $v_{end,Tk+new} > v_{end,Tnew}$ a drag torque ($F_{drive} = 0$) is used.

According to an embodiment, the standardising values $E_{pred\_cc}$ and $t_{pred\_cc}$ are not updated to obtain values for exactly the same distance traveled as the other predictions. For example, the values may be updated for each simulation cycle. The distance $s_\gamma$ is so short relative to the total distance predicted that the standardisation works well even without taking into account energy and time consumed under conventional cruise control over the distance $s_\gamma$.

According to an embodiment of the invention, the at least one reference value is determined to the predicted vehicle speed which results in the lowest total cost ($J_{Tnew}$ or $J_{Tk+new}$).

According to an embodiment, a specific reference value which differs from the set speed, i.e. if the reference value determined is for example $v_{pred\_Tnew}$ or $v_{pred\_Tk+new}$, may be obtained during the time when the vehicle is for example on a steep hill. Control action which jumps between different modes of driving/predictions is thus avoided. A steep hill may here be identified as a hill where the gradient exceeds a predetermined value.

An embodiment of the invention takes the engine's efficiency and comfort/drivability into account in predicting the second predicted vehicle speed $v_{pred\_Tnew}$ and the third predicted vehicle speed $v_{pred\_Tk+new}$, i.e. in choosing the control strategies to be predicted when the second predicted vehicle speed $v_{pred\_Tnew}$ and the third predicted vehicle speed $v_{pred\_Tk+new}$ are determined. Determining the torque T in terms of magnitude and/or time according to the engine's efficiency or on the basis of comfort requirements, resulting in different magnitudes of the second predicted vehicle speed $v_{pred\_Tnew}$, makes it possible to achieve comfortable and economical cruise control. This embodiment may be implemented on the basis of rules, e.g. that the engine has to have a certain torque at a certain engine speed or that torque which results in more acceleration than a certain limit value is never allowed.

According to an aspect of the invention a computer programme product is proposed which comprises programme instructions for enabling a computer system in a vehicle to perform steps according to the method described when those instructions are run on said computer system. The invention comprises also a computer programme product in which the programme instructions are stored on a medium which can be read by a computer system.

The present invention is not restricted to the embodiments described above. Various alternatives, modifications and equivalents may be used. The aforesaid embodiments therefore do not limit the scope of the invention. The invention is defined by the attached claims.

The invention claimed is:

1. A method for controlling a speed of a vehicle based on at least one reference value, the method comprising:
   acquiring a set speed for the vehicle;
   determining a horizon for an itinerary of the vehicle by reference to map data and location data, which horizon comprises one or more route segments, each route segment having at least one route characteristic;
   performing, by a module comprising an automated processor, a number of simulation cycles $s_j$, each simulation cycle comprising a number of simulation steps conducted at a predetermined rate, the simulation steps comprising:
      making a first prediction of the speed of the vehicle according to a conventional cruise control when the set speed is imparted as the reference speed wherein the first prediction depends on the at least one route characteristic of said route segment;
      comparing, as a first comparison, the first predicted speed with at least one of first lower and upper limit values and, wherein the first lower and upper limit values define an engine torque for use in an immediately following simulation cycle $s_{j+1}$;

making a second prediction of the speed of the vehicle, wherein an engine torque is a value which depends on a result of said first comparison in the immediately preceding simulation cycle $s_{j-1}$;

comparing, as a second comparison, the second predicted speed of the vehicle with at least one of second lower and upper limit values, wherein the second lower and upper limit values delineate a speed range within which the speed of the vehicle is maintained;

determining the at least one reference value based on said second comparison and/or the second predicted vehicle speed in this simulation cycle $s_j$; and outputting to a control system of the vehicle said at least one reference value, and regulating a speed of the vehicle accordingly.

2. A method according to claim 1, wherein each of said simulation steps has a step length which depends on the speed of the vehicle.

3. A method according to claim 1, wherein said at least one reference value is at least one of the following:
a reference vehicle speed $v_{ref}$,
a reference torque $T_{ref}$, and
a reference engine speed $\omega_{ref}$.

4. A method according to claim 1, wherein the engine torque in the second prediction is a torque required to retard the vehicle below the first predicted vehicle speed in this simulation cycle $s_j$ when this first predicted speed is determined to be above the first upper limit value in an immediately preceding simulation cycle $s_{j+1}$.

5. A method according to claim 4, wherein said at least one reference value is at least one reference value determined during a previous simulation cycle $s_{j-n}$ when the second predicted vehicle speed is below the second lower limit value in said second comparison.

6. A method according to claim 4, wherein a highest first predicted vehicle speed and a lowest first predicted vehicle speed are determined during the first prediction of the speed of the vehicle according to a conventional cruise control, which highest and lowest first predicted speeds are then used in the first comparison with the respective first lower and upper limit values to determine the engine torque T in the second prediction.

7. A method according to claim 1, wherein the engine torque in the second prediction is a torque required to accelerate the vehicle above the first predicted vehicle speed in this simulation cycle $s_j$ when this first predicted speed is determined to be below the first lower limit value in the immediately preceding simulation cycle $s_{j-1}$.

8. A method according to claim 7, wherein said at least one reference value is the at least one reference value determined during a previous simulation cycle $s_{j-n}$ when the second predicted vehicle speed is above the second upper limit value in said second comparison.

9. A method according to claim 1, wherein the method further comprises applying a hysteresis to said at least one reference value.

10. A method according to claim 1, wherein the method further comprises applying rules to determine the at least one reference value.

11. A method according to claim 10, wherein a rule is that the at least one reference value is the set speed when the second predicted vehicle speed in the second comparison is above the second upper limit value or below the second lower limit value.

12. A method according to claim 10, wherein the at least one reference value is the second predicted speed when both following conditions are true:
(a) a minimum value for this second predicted speed is equal to or above the second lower limit value, and
(b) a maximum value for the second predicted speed is equal to or above a further upper limit value,
wherein the further upper limit value corresponds to the set speed plus a constant.

13. A method according to claim 10, wherein the at least one reference value is the second predicted vehicle speed when both following conditions are true:
(a) a maximum value for this second predicted speed is equal to or below the upper limit value, and
(b) a minimum value for the second predicted speed is equal to or below a further lower limit value,
wherein the further lower limit value corresponds to a set speed minus a constant.

14. A method according to claim 1, wherein at least one further prediction of the speed of the vehicle is made in each simulation cycle $s_j$, each such further prediction of the speed of the vehicle being based on a torque which is required to raise the speed of the vehicle above the first predicted vehicle speed, or on a torque which is required to lower the speed of the vehicle below the first predicted speed, and the torque on which the at least one further prediction is based depends on said first comparison in the immediately preceding simulation cycle $s_{j-1}$.

15. A method according to claim 14, wherein a total of three different predictions $v_{pred\_cc}$, $v_{pred\_Tnew}$ and $v_{pred\_Tk+new}$ of the speed are made.

16. A method according to claim 1, wherein a speed profile v, energy consumption $E_N$ and journey time $t_N$ of the vehicle are calculated during each prediction.

17. A method according to claim 16, wherein the simulations are evaluated by calculating a cost for the second predicted vehicle speed and/or a third predicted vehicle speed.

18. A method according to claim 17, wherein the cost is calculated by employing cost functions $J_{Tnew}$ and $J_{Tk+new}$ for the second predicted vehicle speed and a third predicted vehicle speed, wherein the cost functions $J_{Tnew}$ and $J_{Tk+new}$, respectively, use weighting with a weighting parameter β, of energy reductions and journey time reductions relative to the first predicted speed.

19. A method according to claim 18, wherein the method further comprises:
comparing, as a fourth comparison, the cost functions $J_{Tnew}$ and $J_{Tk+new}$ for the second predicted vehicle speed and for a third predicted vehicle speed; and
determining based on the fourth comparison the reference value.

20. A method according to claim 16, further comprising:
adding a penalty to at least one of the cost functions $J_{Tnew}$, $J_{Tk+new}$ for the second predicted vehicle speed, and for a third predicted vehicle speed, when the second and third predicted speeds reach different final speeds.

21. The method of claim 1, wherein the method is performed according to instructions incorporated on a non-transitory computer-readable medium product when the instructions are run on a processor.

22. A module arranged to control a speed of a vehicle, the module comprising:
a vehicle driver-indicated vehicle speed signal generator configured to receive a set speed for the vehicle;
a vehicle itinerary processor configured to determine an itinerary by reference to map data and location data which comprise route segments, each route segment having at least one route characteristic;

a vehicle speed simulator configured to perform a number of simulation cycles $s_j$, each simulation cycle including a number N of simulation steps conducted at a predetermined rate, the simulation steps comprising:

making a first prediction of the speed of the vehicle such that a set speed received for the vehicle is imparted as a reference speed, the first prediction depending on the route characteristic of said route segment;

comparing, as a first comparison, the first predicted vehicle speed with at least one of first lower and upper limit values, wherein the first lower and upper limit values define an engine torque for use in an immediately following simulation cycle $s_{j+1}$;

making a second prediction of the speed of the vehicle such that the engine torque is a value which depends on the result of said first comparison in an immediately preceding simulation cycle $s_{j-1}$;

comparing, as a second comparison, the second predicted vehicle speed with at least one of second lower and upper limit values and of the vehicle, the second lower and upper limit values delineating a range within which the speed is maintained; and determining at least one reference value based on said second comparison and/or the second predicted vehicle speed in this simulation cycle $s_j$; and a vehicle speed regulator configured to supply a control system of the vehicle with said at least one reference value for regulating the vehicle.

23. A module according to claim 22, wherein said vehicle speed simulator is configured:

to use during each simulation cycle of the N simulation steps, a constant step length, the constant step length depending on the speed of the vehicle, and to adjust said step length based on the speed of the vehicle.

24. A module according to claim 22, wherein said at least one reference value is at least one of the following:

a reference vehicle speed $v_{ref}$ a reference torque $T_{ref}$ a reference engine speed $\omega_{ref}$.

25. A module according to claim 22, wherein the vehicle speed simulator is configured to take the engine torque in the second prediction as a torque which is required to retard the vehicle below the first predicted vehicle speed in this simulation cycle $s_j$, when this first predicted speed is determined to be above the first upper limit value $v_{lim2}$ in the immediately preceding simulation cycle $s_{j-}$.

26. A module according to claim 25, wherein the vehicle speed simulator determines said at least one reference value according to the at least one reference value determined during a previous simulation cycle $s_{j-n}$ when the second predicted vehicle speed is below the second lower limit value in said second comparison.

27. A module according to claim 25, wherein the vehicle speed simulator is configured:

to determine a highest first predicted vehicle speed and a lowest first predicted vehicle speed during the first prediction of the speed according to a conventional cruise control, and to use the highest and lowest first predicted speeds in the first comparison with the respective first lower and upper limit values and to determine the engine torque in the second prediction.

28. A module according to claim 22, wherein the vehicle speed simulator is configured to take the engine torque in the second prediction as a torque which is required to accelerate the vehicle above the first predicted vehicle speed in this simulation cycle $s_j$, when this first predicted speed is determined to be below the first lower limit value in the immediately preceding simulation cycle $s_{j-1}$.

29. A module according to claim 28, wherein the vehicle speed simulator determines said at least one reference value as the at least one reference value determined during a previous simulation cycle $s_{j-n}$ when the second predicted vehicle speed is above the second upper limit value in said second comparison.

30. A module according to claim 22, wherein the vehicle speed simulator is configured to apply a hysteresis to said at least one reference value.

31. A module according to claim 22, wherein the vehicle speed simulator is configured to apply rules to determine the at least one reference value.

32. A module according to claim 31, wherein the vehicle speed simulator is configured to apply a rule that the at least one reference value is determined to a value which represents the set speed when the second vehicle predicted speed in the second comparison is above the second upper limit value or below the second lower limit value.

33. A module according to claim 31, wherein the vehicle speed simulator is configured to determine the at least one reference value to a value which represents the second predicted vehicle speed when a minimum value for this second predicted speed is equal to or above the second lower limit value, and when a maximum value for the second predicted speed is equal to or above a further upper limit value, the further upper limit value corresponding to a set speed plus a constant.

34. A module according to claim 31, wherein the vehicle speed simulator is configured to determine the at least one reference value to a value which represents the second predicted vehicle speed when a maximum value for this second predicted speed is equal to or below the upper limit value and when a minimum value for the second predicted speed is equal to or below a further lower limit value, the further lower limit value corresponding to a set speed minus a constant.

35. A module according to claim 22, wherein the vehicle speed simulator is configured to make at least one further prediction of the speed of the vehicle in each simulation cycle $s_j$, each such further prediction of the speed being based on a torque required to raise the speed above the first predicted speed, or based on a torque required to lower the speed below the first predicted vehicle speed, and the torque on which the at least one further first prediction is based depends on said first comparison in the immediately preceding simulation cycle $s_{j-1}$.

36. A module according to claim 35, wherein the vehicle speed simulator is configured to make a total of three different predictions $v_{pred\_cc}$, $v_{pred\_Tnew}$ and $v_{pred\_Tk+new}$ of the speed of the vehicle during the simulation cycle.

37. A module according to claim 22, wherein the vehicle speed simulator is configured to calculate a speed profile v, energy consumption $E_N$ and journey time $t_N$ of the vehicle during each prediction.

38. A module according to claim 37, wherein the vehicle speed simulator is configured to evaluate the simulations by calculating a cost for the second predicted vehicle speed and/or a third predicted vehicle speed by using at least one cost function.

39. A module according to claim 38, wherein the vehicle speed simulator is configured to determine cost functions $J_{Tnew}$ and $J_{Tk+new}$ for the second predicted vehicle speed and a third predicted vehicle speed by weighting using weighting parameter $\beta$, respectively, energy reductions and journey time reductions relative to the first predicted speed.

40. A module according to claim 39, wherein the vehicle speed simulator is configured to compare, as a fourth comparison, the cost functions $J_{Tnew}$ and $J_{Tk+new}$, respectively, for the second predicted vehicle speed and for a third predicted vehicle speed to determine the at least one reference value.

41. A module according to claim 37, wherein the vehicle speed simulator is configured to add a penalty to at least one of the cost functions $J_{Tnew}$, $J_{Tk+new}$, for the second predicted vehicle speed, and for a third predicted vehicle speed, when the second and third predicted speeds reach different final speeds.

42. The module of claim 22 in combination with the control system.

* * * * *